(12) United States Patent
Chen et al.

(10) Patent No.: US 8,064,511 B2
(45) Date of Patent: Nov. 22, 2011

(54) EQUALIZATION APPARATUS, EQUALIZATION METHOD AND RECEIVER USING THE SAME

(75) Inventors: Po-Ying Chen, Hsinchu (TW);
Shin-Yuan Wang, Hsinchu (TW)

(73) Assignee: Sunplus mMobile Inc., Hsinchu (TW)

( * ) Notice: Subject to any disclaimer, the term of this patent is extended or adjusted under 35 U.S.C. 154(b) by 752 days.

(21) Appl. No.: 12/135,218

(22) Filed: Jun. 9, 2008

(65) Prior Publication Data
US 2009/0225823 A1    Sep. 10, 2009

(30) Foreign Application Priority Data

Mar. 10, 2008   (TW) .................... 97108348 A

(51) Int. Cl.
*H03H 7/30* (2006.01)
*H03H 7/40* (2006.01)
*H03K 5/159* (2006.01)

(52) U.S. Cl. ..................................... 375/230
(58) Field of Classification Search .......... 375/220, 375/229, 230, 232, 233, 298, 316, 324, 340, 375/347, 348, 350; 370/203, 208, 335, 342
See application file for complete search history.

(56) References Cited

U.S. PATENT DOCUMENTS

| | | | |
|---|---|---|---|
| 5,303,264 A * | 4/1994 | Ohsawa | 375/230 |
| 2003/0133424 A1* | 7/2003 | Liang et al. | 370/335 |
| 2004/0008764 A1* | 1/2004 | Seo et al. | 375/229 |
| 2004/0223480 A1* | 11/2004 | Nguyen et al. | 370/342 |
| 2006/0109892 A1* | 5/2006 | Li et al. | 375/148 |
| 2008/0075208 A1* | 3/2008 | Li et al. | 375/347 |
| 2008/0075209 A1* | 3/2008 | Li et al. | 375/347 |

OTHER PUBLICATIONS

Jianzhong Zhang et al., Efficient Linear Equalization for High Data Rate Downlink CDMA Signaling, IEEE 2003 pp. 141-145.
Thomas P. Krauss et al., Simple MMSE Equalizers for CDMA Downlink to Restore Chip Sequence: Comparison to Zero-Forcing and Rake, IEEE 2000 pp. 2865-2868.

* cited by examiner

*Primary Examiner* — David C. Payne
*Assistant Examiner* — Syed Haider
(74) *Attorney, Agent, or Firm* — Jianq Chyun IP Office

(57) ABSTRACT

This invention relates to an equalization apparatus, an equalization method and a receiver using the same. Two equalizers are applied to the equalization apparatus to cover two clusters of a channel. The weights of the two equalizers are calculated by channel gains of the whole channel based on the minimum mean square error criterion. Therefore the interference of the whole channel due to different clusters can be reduced enormously.

24 Claims, 11 Drawing Sheets

EQUALIZATION APPARATUS, EQUALIZATION METHOD AND RECEIVER USING THE SAME

CROSS-REFERENCE TO RELATED APPLICATION

This application claims the priority benefit of Taiwan application serial no. 97108348, filed Mar. 10, 2008. The entirety of the above-mentioned patent application is hereby incorporated by reference herein and made a part of this specification.

BACKGROUND OF THE INVENTION

1. Field of the Invention

The present invention relates to an equalization technique. More particularly, the present invention relates to an equalization technique for a channel with multiple clusters.

2. Description of Related Art

In a wireless communication environment, there may be a multi-path phenomenon due to diffractions and refractions of electromagnetic waves caused by obstacles located between a receiver and a transmitter. Therefore, when a channel thereof is observed in time domain, the channel may have a plurality of delay paths, while when the channel is observed in frequency domain, the channel may be regarded as a frequency-selective channel. As to the present various communication systems, a spread-spectrum system is more likely to be interfered by the frequency-selective channel, which may decrease a performance of the receiver.

Taking a present code division multiple access (CDMA) system for an example, to solve the problem of an interference in a frequency-selective channel, a receiver of the CDMA system generally applies an equalization technique for equalizing the frequency-selective channel. In other words, an equalizer is used to convert the frequency-selective channel into a frequency-flat channel, so as to reduce the multipath interference.

FIG. 1 is a system block diagram of a conventional CDMA receiver applying an equalizer. Referring to FIG. 1, a channel response of a received signal r[m] is estimated by a channel estimation unit 110, namely, a delay time $\tau$ of each delay path within the channel and a channel gain $\hat{h}(\tau)$ corresponding to each delay time are estimated, and a plurality of weights $w_0$, $w_1, w_2, \ldots, w_{F-1}$ of an equalizer 130 are estimated according to the estimated channel gains $\hat{h}(\tau)$, and then the weights $w_0$, $w_1, w_2, \ldots, w_{F-1}$ are output to the equalizer 130. Next, the equalizer 130 sequentially delays the received signals r[m] for a chip duration $T_C$. Then, after respectively multiplying the original received signal r[m] and the delayed received signals r[m−1], r[m−2], ..., r[m−F+1] with the weights $w_0$, $w_1, w_2, w_{F-1}$, a combination of above multiple multiplications is then output. A correlator 150 de-spreads the equalized signal according to a spreading code c[n], and a decision unit 170 is used for demodulating a digital signal $\hat{b}$.

A window length of the equalizer 130 is represented by F. For a present equalization technique, a plurality of documents (for example, note [1]) refers to that the window length F of the equalizer has to be greater than or equal to twice of a channel length thereof, so that the equalizer may effectively eliminate the interference of the channel to the received signals. Therefore, from the viewpoint of hardware implementation in a receiver, if the window length of channel estimation is L, the window length F of the equalizer is then designed to be 2L.

However, in a channel with relatively large delay spread, the multipath signals might be separated quite far apart, as shown in FIG. 2. FIG. 2 is a diagram illustrating a channel power delay profile. Referring to FIG. 2, horizontal coordinates thereof represent delay times $\tau$ with a unit of nanosecond (ns), and vertical coordinates represent powers $|\hat{h}(\tau)|^2$ with a unit of dB. According to FIG. 2, the delay paths within the channel are sparsely distributed in time domain, and the delay paths may be grouped into two clusters of cluster 1 and cluster 2. The cause of such channel phenomenon may be that in a hilly terrain (HT), the electromagnetic waves emitted from the transmitter are received by the receiver after a long distance reflection, so that the delay paths of the cluster 2 are generated. Alternatively, the receiver may be just located within transmission ranges of two base stations, so that the receiver may simultaneously receive signals from the two base stations, and therefore the delay paths of the cluster 1 and the cluster 2 are generated.

Consider a channel environment of FIG. 2, due to a limitation of the hardware, if the window length of the equalizer of the receiver maintains to be F=2L, here L is assumed to be the channel length of cluster 1, the window length of the equalizer is not enough for each of the delay paths within the channel, so that the equalizer cannot equalize the transmission channel, and accordingly performance of the receiver is degraded.

A U.S. patent laid-open publication No. 2006/0109892 A1 provides a receiver having two equalizers, as shown in FIG. 3. Wherein, the two equalizers 335 and 340 of the receiver 300 equalize the received signals respectively based on delay paths 305A and 305B of two clusters. Next, the signals equalized by the two equalizers 335 and 340 are combined for outputting to a CMIS circuit 352. The CMIS circuit 352 reconstructs the interfering signals, which are used to be subtracted from the received signal through the adders 325 and 330.

According to the aforementioned U.S. patent laid-open publication, when the weights are calculated, calculation of the weights of equalizer 335 only considers a channel response of the delay path 305A of the first cluster, and calculation of the weights of equalizer 340 only considers a channel response of the delay path 305B of the second cluster. In other words, the weights of the equalizers 335 and 340 are not calculated under a minimum mean square error (MMSE) criterion. Actually, in such a two-cluster channel, the signal received by the equalizer 335 is interfered by the delay path 305B of the second cluster. However, the equalizer 335 may only mitigate the interference of the delay path 305A of the first cluster. Similarly, the signal received by the equalizer 340 is interfered by the delay path 305A of the first cluster. But the equalizer 340 may only mitigate the interference of the delay path 305B of the second cluster. Therefore, though the two equalizers 335 and 340 are applied in the aforementioned patent, interferences of the delay paths 305A and 305B cannot be simultaneously mitigated. Since the equalizers 334 and 340 cannot totally eliminate the interferences within the channel, the signal reconstructed by the CMIS circuit still may contain interference. While the reconstructed signal polluted by interference is still fed back to the adders 325 and 330, the error propagation in the receiver occurs. Moreover, when the signal-to-interference plus noise ratio (SINR) at the receiver is low, such feed-back mechanism may lead to the error propagation, and hence degrade the reception performance.

Note [1]: M. Melvasalo, P. Jänis and V. Koivunen., "Low complexity space-time MMSE equalization in WCDMA systems," proc. of 2005 IEEE 16$^{th}$ International Symposium on Personal, Indoor and Mobile Radio Communications, Berlin, Germany, pp. 306-310, 2005.

SUMMARY OF THE INVENTION

The present invention is directed to an equalization apparatus and a method thereof, by which a receiver may sufficiently process interferences of different clusters, so as to greatly reduce interferences of received signals.

The present invention is directed to a receiver, which applies two equalizers to eliminate interferences of delay paths within different clusters, so as to increase the performance of the equalizers.

The present invention provides an equalization apparatus for receiving a received signal from a transmitter via a transmission channel. The transmission channel has a plurality of delay paths, and the delay paths are grouped into at least a first cluster and a second cluster. The equalization apparatus includes a channel estimation unit, a weight calculation unit, a first equalizer and a second equalizer. Wherein, the channel estimation unit estimates gains of the delay paths corresponding to the first cluster and gains of the delay paths corresponding to the second cluster. The weight calculation unit performs the weights calculation to obtain a plurality of first weights and a plurality of second weights. These weights are calculated by the gains of the delay paths corresponding to the first cluster and the second cluster, based on a minimum mean square error (MMSE) criterion. The first equalizer equalizes the received signal according to the first weights to obtain a first equalized signal. The second equalizer equalizes the received signal according to the second weights to obtain a second equalized signal.

The present invention provides an equalization method, which may be described as follows. First, a received signal is received from a transmitter via a transmission channel, wherein the transmission channel has a plurality of delay paths, and the delay paths are at least grouped into a first cluster and a second cluster. Next, gains of the delay paths corresponding to the first cluster and gains of the delay paths corresponding to the second cluster are estimated. Next, an MMSE calculation is performed according to the gains of the delay paths corresponding to the first cluster and the second cluster to obtain a plurality of first weights and a plurality of second weights. Finally, the received signal is equalized according to the first weights to obtain a first equalized signal, and the received signal is equalized according to the second weights to obtain a second equalized signal.

The present invention provides a receiver for receiving a received signal from a transmitter via a transmission channel, wherein the transmission channel has a plurality of delay paths, and the delay paths are at least grouped into a first cluster and a second cluster. The receiver includes a channel estimation unit, a weight calculation unit, a first equalizer, a second equalizer and a combination unit. Wherein, the channel estimation unit estimates gains of the delay paths corresponding to the first cluster and gains of the delay paths corresponding to the second cluster. The weight calculation unit performs an MMSE calculation according to the gains of the delay paths corresponding to the first cluster and the second cluster to obtain a plurality of first weights and a plurality of second weights. The first equalizer equalizes the received signal according to the first weights to obtain a first equalized signal. The second equalizer equalizes the received signal according to the second weights to obtain a second equalized signal. The combination unit combines the first equalized signal and the second equalized signal, and outputs a combined signal. A demodulation unit demodulates the combined signal, and outputs a digital signal.

In an embodiment of the present invention, the channel estimation unit has a channel estimation window represented by W, the gains of the delay paths corresponding to the first cluster, which are estimated by the channel estimation unit are represented by $h[0], h[1], \ldots, h[W-1]$ the gains of the delay paths corresponding to the second cluster, which are estimated by the channel estimation unit are represented by $h[K], h[K+1], \ldots, h[K+W-1]$, a delay time difference between the first cluster and the second cluster is represented by K, the first weights are respectively represented by $w_{1,0}, w_{1,1}, w_{1,2}, \ldots, w_{1,F-1}$, the second weights are respectively represented by $w_{2,0}, w_{2,1}, w_{2,2}, \ldots, w_{2,F-1}$, and the received signal corresponding to a time index m is represented by $r[m]$. The weight calculation unit calculates the first weights and the second weights according to $$[w_1^T \ w_2^T]^T = \underline{\underline{R_y}}^{-1} \left( \frac{\overline{\underline{H_2}}}{\overline{\underline{H_1}}} \right)_D,$$

wherein the superscript T represents a matrix transposition operator, the superscript $-1$ represents an inverse matrix calculation operator, $w_1 = [w_{1,0} \ w_{1,1} \ \cdots \ w_{1,F-1}]$, $w_2 = [w_{2,0} \ w_{2,1} \ \cdots \ w_{2,F-1}]$, $\underline{\underline{R_y}}$ represents an autocorrelation matrix of a received vector $\underline{y[m]}$, the received vector $$\underline{y}[m] = (\underline{r}^T[m] \ \underline{r}^T[m-K])^T,$$

$$\underline{r}[m] = (r[m] \ r[m-1] \ \cdots \ r[m-F+1])^T,$$

$$\underline{r}[m-K] = (r[m-K] \ r[m-K-1] \ \cdots \ r[m-K-F+1])^T,$$

$$\underline{\underline{H_1}} = \begin{bmatrix} h[0] & h[1] & \cdots & \cdots & h[W-1] & 0 & \cdots & \cdots & 0 \\ 0 & h[0] & h[1] & \cdots & h[W-2] & h[W-1] & 0 & \cdots & 0 \\ \vdots & 0 & \ddots & \ddots & \ddots & \ddots & \ddots & \ddots & \vdots \\ \vdots & \vdots & \ddots & \ddots & \ddots & \ddots & \ddots & \ddots & 0 \\ 0 & 0 & \cdots & 0 & h[0] & h[1] & \cdots & \cdots & h[W-1] \end{bmatrix},$$

$$\underline{\underline{H_2}} = \begin{bmatrix} h[K] & h[K+1] & \cdots & \cdots & h[K+W-1] & 0 & \cdots & \cdots & 0 \\ 0 & h[K] & h[K+1] & \cdots & h[K+W-2] & h[K+W-1] & 0 & \cdots & 0 \\ \vdots & 0 & \ddots & \ddots & \ddots & \ddots & \ddots & \ddots & \vdots \\ \vdots & \vdots & \ddots & \ddots & \ddots & \ddots & \ddots & \ddots & 0 \\ 0 & 0 & \cdots & 0 & h[K] & h[K+1] & \cdots & \cdots & h[K+W-1] \end{bmatrix},$$

$$\begin{pmatrix} \underline{\underline{H_2}} \\ \underline{\underline{H_1}} \end{pmatrix}_D$$

represents a vector stacked by elements of $D^{th}$ columns of $\underline{\underline{H_2}}$ and $\underline{\underline{H_1}}$, and D is any positive integer less than or equal to $F+W-1$.

In an embodiment of the present invention, the weight calculation unit calculates the first weights and the second weights according to $\underline{w_1} \approx \text{IDFT}\{\underline{\underline{\Lambda_A}} \text{DFT}\{\underline{h_{2,D}}\} + \underline{\underline{\Lambda_C}} \text{DFT}\{\underline{h_{1,D}}\}\}$, and $\underline{w_2} \approx \text{IDFT}\{\underline{\underline{\Lambda_A}} \text{DFT}\{\underline{h_{1,D}}\} + \underline{\underline{\Lambda_C}}^H \text{DFT}\{\underline{h_{2,D}}\}\}$, wherein $\underline{h_{2,D}}$ represents a vector formed by elements of a $D^{th}$ column of $\underline{\underline{H_2}}$, $\underline{h_{1,D}}$ represents a vector formed by elements of the $D^{th}$ column of $\underline{\underline{H_1}}$. IDFT represents inverse discrete Fourier transform, and DFT represents discrete Fourier transform. $\underline{\underline{\Lambda_A}} = (\underline{\underline{D_{11}}} \underline{\underline{D_S}}^{-1})$ and $\underline{\underline{\Lambda_C}} = (-\underline{\underline{D_{12}}} \underline{\underline{D_S}}^{-1})$ are diagonal matrices, wherein $\underline{\underline{D_S}} = \underline{\underline{D_{11}}} \underline{\underline{D_{11}}}^H - \underline{\underline{D_{12}}} \underline{\underline{D_{12}}}^H$, $\underline{\underline{D_{11}}} = \text{diag}\{\underline{F} \cdot (\underline{\underline{S_{11}}})_1\}$, and $\underline{\underline{D_{12}}} = \text{diag}\{\underline{F} \cdot (\underline{\underline{S_{12}}})_1\}$, wherein $\text{diag}\{\underline{x}\}$ represents a diagonal matrix, and diagonal elements thereof are composed of elements of a vector x, moreover, $(\cdot)_1$ represents that elements of a first column of the matrix are extracted, $\underline{\underline{F}}$ represents a DFT matrix, $\underline{\underline{S_{11}}}$ and $\underline{\underline{S_{12}}}$ are circulant matrices approximated by $\underline{\underline{R_{11}}}$ and $\underline{\underline{R_{12}}}$, and $\underline{\underline{R_{11}}} = \underline{\underline{H_1}} \underline{\underline{H_1}}^H + \underline{\underline{H_2}} \underline{\underline{H_2}}^H + \sigma_v^2 \underline{\underline{I_F}}$, $\underline{\underline{R_{12}}} = \underline{\underline{H_2}} \underline{\underline{H_1}}^H$, wherein $\sigma_v^2$ represents a variance of Gaussian noise within the transmission channel, $\underline{\underline{I_F}}$ represents a identity matrix with a dimension of F×F.

In an embodiment of the present invention, the first equalizer includes a plurality of first delay units, a plurality of first multiplication units and a first adder. Wherein, the first delay units sequentially delay the received signals r[m] for a unit time, and respectively output a plurality of first delayed signals, wherein the first delayed signals are represented by r[m-1], r[m-2], ..., r[m-F+1]. The first multiplication units respectively multiply the received signal r[m] and the first delayed signals r[m-1], r[m-2], ..., r[m-F+1] with conjugations of the corresponding first weights $w_{1,0}^*$, $w_{1,1}^*$, $w_{1,2}^*$, ..., $w_{1,F-1}^*$ to obtain a plurality of first multiplied signals $w_{1,0}^* \cdot r[m]$, $w_{1,1}^* \cdot r[m-1]$, $w_{1,2}^* \cdot r[m-2]$, ..., $w_{1,F-1}^* \cdot r[m-F+1]$. The first adder adds the first multiplied signals $w_{1,0}^* \cdot r[m]$, $w_{1,1}^* \cdot r[m-1]$, $w_{1,2}^* \cdot r[m-2]$, ..., $w_{1,F-1}^* \cdot r[m-F+1]$ to obtain the first equalized signal.

In an embodiment of the present invention, the equalization apparatus further includes a cluster delay unit, the cluster delay unit delays the received signal r[m] for K unit time to obtain a cluster delayed signal r[m-K]. The second equalizer includes a plurality of second delay units, a plurality of second multiplication units and a second adder. Wherein, the second delay units sequentially delay the cluster delayed signals r[m-K] for a unit time, and respectively output a plurality of second delayed signals r[m-K-1], r[m-K-2], ..., r[m-K-F+1]. The second multiplication units respectively multiply the cluster delayed signals r[m-K] and the second delayed signals r[m-K-1], r[m-K-2], ..., r[m-K-F+1] with conjugations of the corresponding second weights $w_{2,0}^*$, $w_{2,1}^*$, $w_{2,2}^*$, ..., $w_{2,F-1}^*$ to obtain a plurality of second multiplied signals $w_{2,0}^* \cdot r[m-K]$, $w_{2,1}^* \cdot r[m-K-1]$, $w_{2,2}^* \cdot r[m-K-2]$, ..., $w_{2,F-1}^* \cdot r[m-K-F+1]$. The second adder adds the second multiplied signals $w_{2,0}^* \cdot r[m-K]$, $w_{2,1}^* \cdot r[m-K-1]$, $w_{2,2}^* \cdot r[m-K-2]$, ..., $w_{2,F-1}^* \cdot r[m-K-F+1]$ to obtain the second equalized signal.

In an embodiment of the present invention, the equalization apparatus further includes a multi-path searcher for searching the delay paths within the transmission channel, and judging a number of the clusters within the transmission channel according to a delay time of the delay paths. Moreover, the multi-path searcher is used for searching delay time deference, which is represented by K between the first cluster and the second cluster.

In an embodiment of the present invention, the equalization apparatus further includes a switch. One end of the switch receives the received signal from the channel, and the other end of the switch is coupled to the cluster delay unit for disconnecting to the second equalizer when the multi-path searcher judges the number of the clusters within the transmission channel is one, and connecting to the second equalizer when the multi-path searcher judges the number of the clusters within the transmission channel is greater than one.

In an embodiment of the present invention, the equalization apparatus further includes a switching unit having a first input terminal, a second input terminal and an output terminal. Wherein, the first input terminal of the switching unit receives the cluster delayed signal r[m-K], the second input terminal thereof receives the received signal received from the second antenna, and the output terminal is coupled to the second equalizer. When the multi-path searcher judges the number of the clusters within the transmission channel is one, the second input terminal of the switching unit is coupled to the output terminal, and when the multi-path searcher judges the number of the clusters within the transmission channel is greater than one, the first input terminal of the switching unit is then coupled to the output terminal.

In the present invention, since two equalizers are applied for equalizing the received signals under delay paths of different clusters, and meanwhile weights of the two equalizers are jointly calculated by channel gains of the whole channel based on the MMSE criterion, the interference caused by delay paths of different clusters within the whole channel can be reduced enormously.

In order to make the aforementioned and other objects, features and advantages of the present invention comprehensible, a preferred embodiment accompanied with figures is described in detail below.

DESCRIPTION OF EMBODIMENTS

Figure 4:
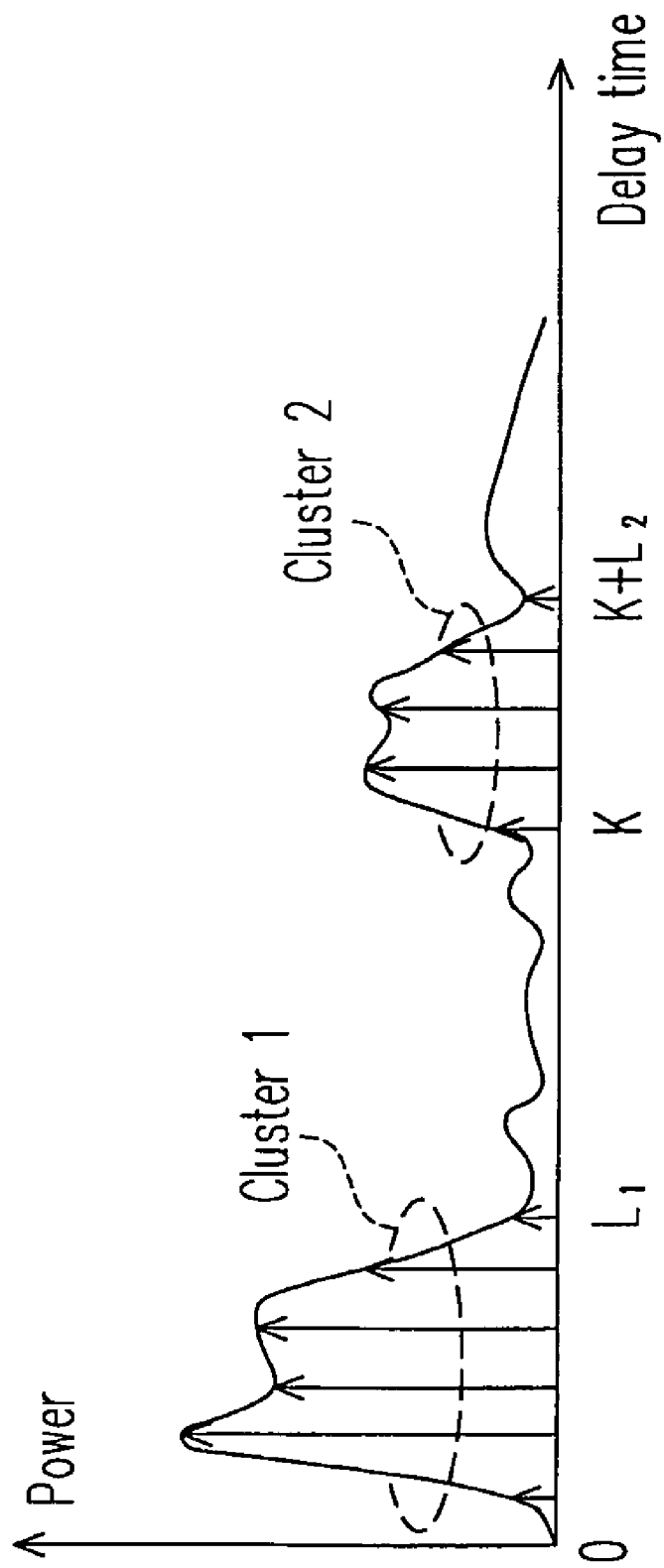
FIG. 4 is a diagram illustrating a transmission channel power delay profile according to an embodiment of the present invention.

To reduce an interference of a channel with excessive delay spread to a received signal, the present embodiment provides an equalization apparatus and a method thereof. For conveniently describing the present embodiment, a transmission channel power delay profile is shown in FIG. 4. Referring to FIG. 4, vertical coordinates thereof represent powers, and horizontal coordinates thereof represent delay time. Moreover, the horizontal coordinates are represented by discrete time. According to FIG. 4, a plurality of delay paths distributed based on delay time may be grouped into a first cluster 1 and a second cluster 2. Wherein, a channel length of the first cluster 1 is assumed to be $L_1$, a channel length of the second cluster 2 is assumed to be $L_2$, a delay time difference between the first cluster 1 and the second cluster 2 is K unit time.

In the following content, the discrete time is used for representing the received signal and a channel response. Moreover, according to FIG. 4, the received signal of a m-th unit time may be represented by:

$$r[m] = \sum_{l=0}^{L_1} h[l]d[m-l] + \sum_{k=K}^{K+L_2} h[k]d[m-k] + v[m] \quad (1)$$

wherein $h[\cdot]$ represents a channel gain, $d[\cdot]$ represents a signal transmitted from a transmitter, and $v[\cdot]$ represents a Gaussian noise.

Figure 5:
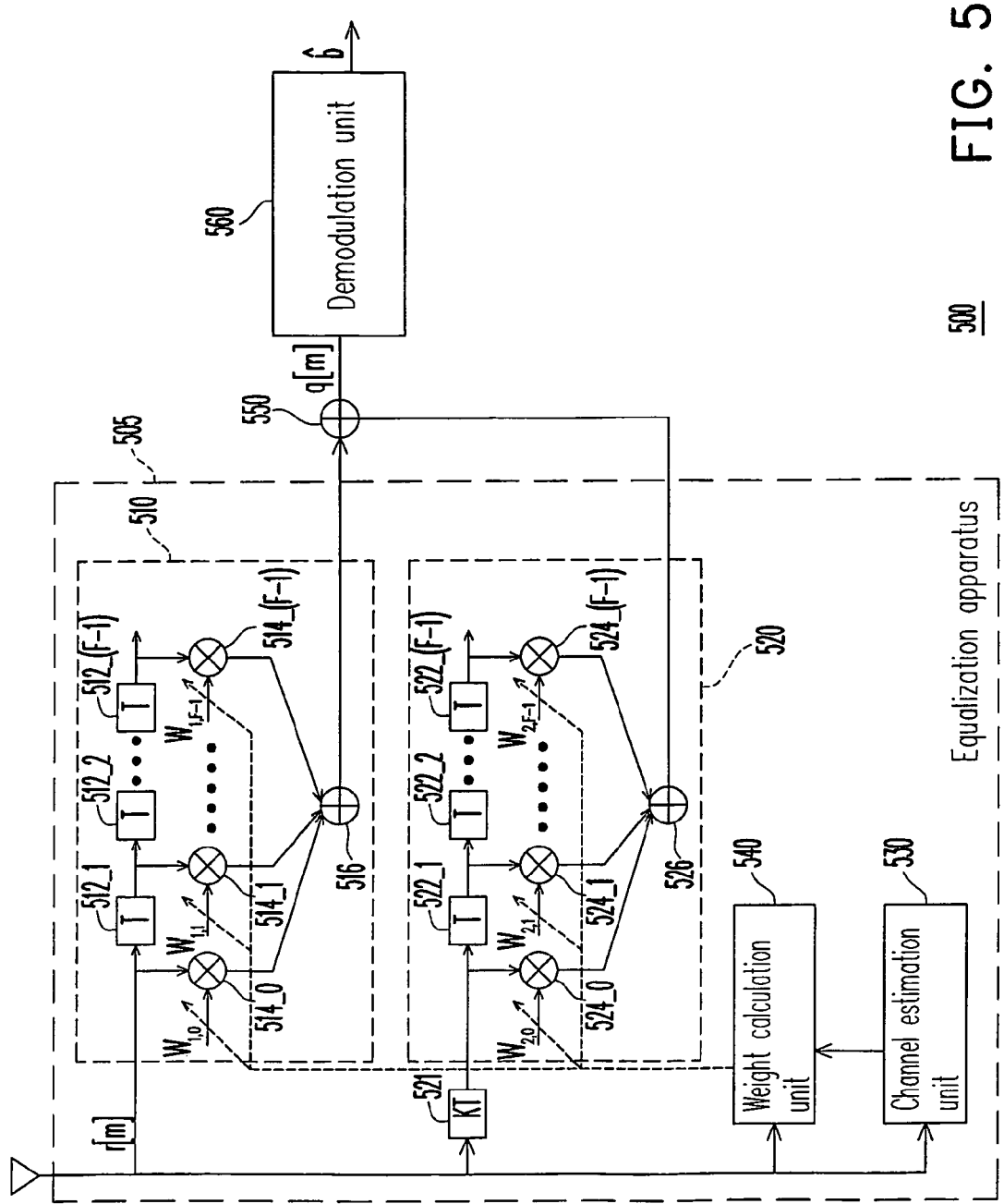
FIG. 5 is a system block diagram illustrating a receiver of an equalization apparatus according to an embodiment of the present invention.

For conveniently describing the present embodiment, the equalization apparatus provided by the present embodiment is assumed to be applied to a receiver, as shown in FIG. 5. FIG. 5 is a system block diagram illustrating a receiver applying an equalization apparatus according to an embodiment of the present invention. Referring to FIG. 5, the receiver 500 includes an equalization apparatus 505 provided by the present embodiment, a demodulation unit 560 and a decision unit 570. Wherein, the equalization apparatus 505 receives a received signal r[m] from the transmitter via a transmission channel, and equalizes the received signal r[m] to eliminate the interference induced by the multipath channel to the received signal r[m]. Next, the equalization apparatus 505 outputs a combined signal q[m] to the demodulation unit 560. The demodulation unit 560 then demodulates the combined signal q[m] and outputs a digital signal $\hat{b}$.

The equalization apparatus 505 includes a first equalizer 510, a second equalizer 520, a cluster delay unit 521, a channel estimation unit 530, a weight calculation unit 540 and a combination unit 550. Wherein, the channel estimation unit 530 estimates channel gains of a plurality of delay paths within the channel. Considering a limitation of hardware, the channel estimation unit 530 may have fixed channel estimation windows $W_1$ and $W_2$ for respectively estimating the delay paths of the first cluster 1 and the second cluster 2. Therefore, the received signal of the aforementioned equation (1) may be represented as:

$$r[m] = \sum_{l=0}^{W_1-1} h[l]d[m-l] + \sum_{k=0}^{W_2-1} h[K+k]d[m-K-k] + v[m] \quad (2)$$

The weight calculation unit 540, based on the minimum mean square error (MMSE) criterion, uses the gains of the delay paths corresponding to the first cluster 1 and the second cluster 2 to obtain a plurality of first weights and a plurality of second weights. Here, assuming the number of the first weights and the second weights are all F, the first weights then may be represented as $w_{1,0}, w_{1,1}, w_{1,2}, \ldots, w_{1,F-1}$, and the second weights may be represented as $w_{2,0}, w_{2,1}, w_{2,2}, \ldots, w_{2,F-1}$. For fluently describing the present embodiment, calculation of the first weights $w_{1,0}, w_{1,1}, w_{1,2}, \ldots, w_{1,F-1}$ and the second weights $w_{2,0}, w_{2,1}, w_{2,2}, \ldots, w_{2,F-1}$ by the weight calculation unit 540 via the MMSE algorithm will be described in detail in later content of the present embodiment.

The first equalizer 510 equalizes the received signal r[m] according to the first weights $w_{1,0}, w_{1,1}, w_{1,2}, \ldots, w_{1,F-1}$ for obtaining a first equalized signal. The cluster delay unit 521 delays the received signal r[m] for K unit time to obtain a first cluster delayed signal r[m−K], and outputs the first cluster delayed signal r[m−K] to the second equalizer 520. The second equalizer 520 equalizes the received signal r[m] according to the second weights $w_{2,0}, w_{2,1}, w_{2,2}, \ldots, w_{2,F-1}$ for obtaining a second equalized signal. The combination unit 550 combines the first equalized signal and the second equalized signal and outputs a combined signal q[m].

For conveniently describing the present embodiment, assuming internal structures of the first equalizer 510 and the second equalizer 520 are finite impulse response (FIR) filters, as shown in FIG. 5. Wherein, the first equalizer 510 includes a plurality of first delay units 512_1~512_(F−1), a plurality of multiplication units 514_0~514_(F−1) and a first adder 516. The first delay units 512_1~512_(F−1) sequentially delay the received signal r[m] for a unit time T, and respectively output a plurality of first delayed signals r[m−1], r[m−2], ..., r[m−F+1]. The multiplication units 514_0~514_(F−1) respectively multiply the received signal r[m] and the first delayed signals r[m−1], r[m−2], ..., r[m−F+1] with conjugations of the first weights $w_{1,0}^*, w_{1,1}^*, w_{1,2}^*, \ldots, w_{1,F-1}^*$ to obtain a plurality of first multiplied signals $w_{1,0}^* \cdot r[m]$, $w_{1,1}^* \cdot r[m-1], w_{1,2}^* \cdot r[m-2], \ldots, w_{1,F-1}^* \cdot r[m-F+1]$. The first adder adds the first multiplied signals $w_{1,0}^* \cdot r[m], w_{1,1}^* \cdot r[m-1], w_{1,2}^* \cdot r[m-2], \ldots, w_{1,F-1}^* \cdot r[m-F+1]$ to obtain the first equalized signal for outputting to the combination unit 550.

The second equalizer 520 includes a plurality of second delay units 522_1~522_(F−1), a plurality of second multiplication units 524_0~524_(F−1) and a second adder 526. Wherein, the second delay units 522_1~522_(F−1) sequentially delay the cluster delayed signals r[m−K] for the unit time, and respectively output a plurality of second delayed signals r[m−K−1], r[m−K−2], ..., r[m−K−F+1]. The second multiplication units 524_0~524_(F−1) respectively multiply the cluster delayed signals r[m−K] and the second delayed signals r[m−K−1], r[m−K−2], ..., r[m−K−F+1] with conjugations of the corresponding second weights $w_{2,0}^*, w_{2,1}^*, w_{2,2}^*, \ldots, w_{2,F-1}^*$ to obtain a plurality of second multiplied signals $w_{2,0}^* \cdot r[m-K], w_{2,1}^* \cdot r[m-K-1], w_{2,2}^* \cdot r[m-K-2], \ldots, w_{2,F-1}^* \cdot r[m-K-F+1]$. The second adder adds the second multiplied signals $w_{2,0}^* \cdot r[m-K], w_{2,1}^* \cdot r[m-K-1], w_{2,2}^* \cdot r[m-K-2], \ldots, w_{2,F-1}^* \cdot r[m-K-F+1]$ to obtain the second equalized signal for outputting to the combination unit 550.

For conveniently describing the present embodiment, the received signal r[m] is represented by a vector $\underline{r}[m]$ wherein $\underline{r}[m] = (r[m]\ r[m-1]\ \ldots\ r[m-F+1])^T$, the first weight is represented by a vector $\underline{w}_1 = [w_{1,0}\ w_{1,1}\ \ldots\ w_{1,F-1}]^T$, and the second weight is represented by a vector $\underline{w}_2 = [w_{2,0}\ w_{2,1}\ \ldots\ w_{2,F-1}]^T$. Wherein, the superscript T represents a matrix transposition operator. For conveniently utilizing mathematic symbols of the present invention, when a mathematic symbol is a vector, it is marked with an underline, for example, such $\underline{r}[m]$ shown above, and when a mathematic symbol is a matrix, it is marked with a double-underline.

According to the operation of the first equalizer 510 of FIG. 5, the r[m] may be the signals respectively received by the first multiplication units 514_0~514_(F−1). Therefore, the first equalized signal output by the first adder may be $w_1^H \cdot r[m]$, wherein the superscript H represents a Hermitian operation. Moreover, according to the operation of the second equalizer 520 of FIG. 5, the r[m−K] may be the signals respectively received by the second multiplication units 524_0~524_(F−1). Therefore, the second equalized signal output by the second adder may be $w_2^H \cdot r[m-K]$. The combined signal output by the equalization apparatus 505 and combined by the adder 550 may be $$q[m] = \begin{bmatrix} w_1^H & w_2^H \end{bmatrix} \cdot \begin{bmatrix} r[m] \\ r[m-K] \end{bmatrix}.$$

In the following content, how the weight calculation unit 540 calculates the first weights $w_{1,0}, w_{1,1}, w_{1,2}, \ldots, w_{1,F-1}$ and the second weights $w_{2,0}, w_{2,1}, w_{2,2}, \ldots, w_{2,F-1}$ is described. For purpose of illustrating the present embodiment, lengths of the channel estimation windows $W_1$ and $W_2$ of the channel estimation unit 530 are assumed to be the same (i.e. $W_1 = W_2 = W$) According to the above equation (2), the signals r[m] and r[m−K] respectively received by the multiplication units 514 and 524 are all interfered by the delay paths of the first cluster 1 and the second cluster 2 within the transmission channel. Therefore, the r[m] and the r[m−K] may be respectively represented as:

$$r[m] = \underline{H_1} d[m] + \underline{H_2} d[m-K] + v[m] \quad (3)$$

$$r[m-K] = \underline{H_1} d[m-K] + \underline{H_2} d[m-2K] + v[m+K] \quad (4)$$

wherein $d[m] = (d[m]\ d[m-1]\ \ldots\ d[m-W-F+1])^T$ $v[m] = (v[m]\ v[m-1]\ \ldots\ v[m-F+1])^T$.

$H_1$ represents a matrix stacked by the channel gains of the delay paths of the first cluster 1, and a value thereof is:

$$\underline{H_1} = \begin{bmatrix} h[0] & h[1] & \cdots & \cdots & h[W-1] & 0 & \cdots & \cdots & 0 \\ 0 & h[0] & h[1] & \cdots & h[W-2] & h[W-1] & 0 & \cdots & 0 \\ \vdots & 0 & \ddots & \ddots & \ddots & \ddots & \ddots & \ddots & \vdots \\ \vdots & \vdots & \ddots & \ddots & \ddots & \ddots & \ddots & \ddots & 0 \\ 0 & 0 & \cdots & 0 & h[0] & h[1] & \cdots & \cdots & h[W-1] \end{bmatrix}_{F \times (F+W-1)} \quad (5)$$

$H_2$ represents a matrix stacked by the channel gains of the delay paths of the second cluster 2, and a value thereof is:

$\underline{H_2} =$ $$\begin{bmatrix} h[K] & h[K+1] & \cdots & \cdots & h[K+W-1] & 0 & \cdots & \cdots & 0 \\ 0 & h[K] & h[K+1] & \cdots & h[K+W-2] & h[K+W-1] & 0 & \cdots & 0 \\ \vdots & 0 & \ddots & \ddots & \ddots & \ddots & \ddots & \ddots & \vdots \\ \vdots & \vdots & \ddots & \ddots & \ddots & \ddots & \ddots & \ddots & 0 \\ 0 & 0 & \cdots & 0 & h[K] & h[K+1] & \cdots & \cdots & h[K+W-1] \end{bmatrix}_{F \times (F+W-1)} \quad (6)$$

For illustrating the present embodiment, the r[m] of the equation (3) and the r[m−K] of the equation (4) are stacked to be a received vector y[m], which may be represented as:

$$y[m] = \begin{bmatrix} r[m] \\ r[m-K] \end{bmatrix} \quad (7)$$

$$= \begin{bmatrix} \underline{H_1} & \underline{H_2} & 0 \\ 0 & \underline{H_1} & \underline{H_2} \end{bmatrix} \times \begin{bmatrix} d[m] \\ d[m-K] \\ d[m-2K] \end{bmatrix} + \begin{bmatrix} v[m] \\ v[m-K] \end{bmatrix}$$

$$y[m] = \underline{H} \times \begin{bmatrix} d[m] \\ d[m-K] \\ d[m-2K] \end{bmatrix} + \begin{bmatrix} v[m] \\ v[m-K] \end{bmatrix}$$

wherein H may be a matrix stacked by the channel gains of the delay paths of the first cluster 1 and the second cluster 2, and a value thereof is:

$$\underline{H} = \begin{bmatrix} \underline{H_1} & \underline{H_2} & 0 \\ 0 & \underline{H_1} & \underline{H_2} \end{bmatrix},$$

in other words, the H is a matrix formed by the channel gains of the whole transmission channel.

According to the equation (7), a relation between the transmitted signal d[m] of the transmitter and the received vector y[m] of the receiver is revealed. The equalization apparatus 505 provided by the present embodiment is used for eliminating the interference induced by the multipath channel to the received signal. Therefore, based on the MMSE criterion, the difference between the combined signal q[m], which is obtained from the first weight $w_1$ and the second weight $w_2$ calculated by the weight calculation unit 540, and the transmitted signal should be minimized. Namely, under the MMSE criterion, the first weight $w_1$ and the second weight $w_2$ should satisfy the following equation:

$$[w_1^T \quad w_2^T]^T = \arg\min_{w_1,w_2} E\{|d[m-(K+D)] - q[m]|^2\} \quad (8)$$

$$= \arg\min_{w_1,w_2} E\{|d[m-(K+D)] - [w_1^H \quad w_2^H] \cdot \underline{y}[m]|^2\}$$

wherein $E[\cdot]$ represents the operation of taking expectation, arg min represents that a minimum value of the function is extracted, and (K+D) represents a decision delay, wherein D may be any positive integer less than or equal to F+W−1.

According to the equation (8), the weights $w_1$ and $w_2$ may be obtained according to a Wiener-Hopf equation:

$$[w_1^T \quad w_2^T]^T = \underline{\underline{R}}_y^{-1} \left(\frac{\underline{H}_2}{\underline{H}_1}\right)_D = \underline{\underline{R}}_y^{-1} \left(\frac{h_{2,D}}{h_{1,D}}\right) \quad (9)$$

wherein $\underline{\underline{R}}_y$ is defined as an autocorrelation matrix of the received vector $\underline{y}[m]$, i.e.

$$\underline{\underline{R}}_y = E[\underline{y}[m] \cdot \underline{y}^H[m]] \left(\frac{\underline{H}_2}{\underline{H}_1}\right)_D$$

represents a vector stacked by elements of $D^{th}$ columns of $H_2$ and $H_1$, $h_{1,D}$ and $h_{2,D}$ are respectively a steering vector, and $h_{2,D}$ represents a vector composed of elements of the $D^{th}$ column of $H_2$, and $h_{1,D}$ represents a vector composed of elements of the $D^{th}$ column of $H_1$.

According to the equation (9), the weight calculation unit 540 may calculate the weights $w_1$ and $w_2$ (i.e. the first weights $w_{1,0}, w_{1,1}, w_{1,2}, \ldots, w_{1,F-1}$ and the second weights $w_{2,0}, w_{2,1}, w_{2,2}, \ldots, w_{2,F-1}$) as long as the $\underline{\underline{R}}_y$, and a multiplication of an inverse matrix of the $\underline{\underline{R}}_y$ and the vector $$\left(\frac{\underline{H}_2}{\underline{H}_1}\right)_D$$

are calculated. Here, to achieve better equalization performance, the D value may be designed to be (F+W)/2, namely, $$\left(\frac{\underline{H}_2}{\underline{H}_1}\right)_D$$

is composed of elements on the middle columns of the matrices $H_2$ and $H_1$. Therefore, according to the $H_2$ and $H_1$ of the equations (5) and (6):

$$\left(\frac{\underline{H}_2}{\underline{H}_1}\right)_D = (0 \ldots 0 h[K+W-1]h$$

$$[K+W-2] \ldots h[K] 0 \ldots 0 h[W-1] h[W-2] \ldots h[0] 0 \ldots 0)^T$$

Since the received signal r[m] and the first delayed signals r[m−1], r[m−2], . . . , r[m−F+1] processed by the first equalizer 510 are simultaneously interfered by the first cluster 1 and the second cluster 2 within the transmission channel, according to the equation (9), when the first weights $w_{1,0}$, $w_{1,1}, w_{1,2}, \ldots, w_{1,F-1}$ corresponding to the first equalizer 510 of the present embodiment are calculated, the corresponding delay paths of the first cluster 1 and the second cluster 2 are simultaneously considered, based on the MMSE criterion, to derive the first weights $w_{1,0}, w_{1,1}, w_{1,2}, \ldots, w_{1,F-1}$. Similarly, the second weights $w_{2,0}, w_{2,1}, w_{2,2}, \ldots, w_{2,F-1}$ are obtained based on the MMSE criterion by taking into consideration the corresponding delay paths of the first cluster 1 and the second cluster 2.

However, according to the equation (9), calculation of the weights $w_1$ and $w_2$ requires to multiply the matrix $\underline{\underline{R}}_y^{-1}$ with a dimension of $2F \times 2F$ and the $$\left(\frac{\underline{H}_2}{\underline{H}_1}\right)_D$$

with the dimension of 2F×1. Moreover, a large amount of calculation is required to be performed for obtaining the inverse matrix of the $\underline{\underline{R}}_y$, so that a calculation complexity during calculation of the weights $w_1$ and $w_2$ by the weight calculation unit 540 is increased. Therefore, another calculation method of the weights $w_1$ and $w_2$ is provided by the present embodiment for decreasing the calculation complexity of the weights $w_1$ and $w_2$.

Since the signal d[m] transmitted from the transmitter is independent, and under the MMSE criterion, the autocorrelation matrix $\underline{\underline{R}}_y$ of the received vector $\underline{y}[m]$ may be represented as:

$$\underline{\underline{R}}_y = \underline{\underline{H}}\underline{\underline{H}}^T + \sigma_v^2 \underline{\underline{I}}_{2F} \quad (10)$$

wherein $\sigma_v^2$ represents a variance of the Gaussian noise, and $I_{2F}$ represents an identity matrix with a dimension of 2F×2F. Since the matrix $$\underline{\underline{H}} = \begin{bmatrix} \underline{H}_1 & \underline{H}_2 & 0 \\ 0 & \underline{H}_1 & \underline{H}_2 \end{bmatrix},$$

the equation (10) may be written as:

$$\underline{\underline{R}}_y = \begin{bmatrix} \underline{H}_1\underline{H}_1^H + \underline{H}_2\underline{H}_2^H + \sigma_v^2 I_F & \underline{H}_2\underline{H}_1^H \\ \underline{H}_1\underline{H}_2^H & \underline{H}_1\underline{H}_1^H + \underline{H}_2\underline{H}_2^H + \sigma_v^2 I_F \end{bmatrix} \quad (11)$$

$$= \begin{bmatrix} \underline{R}_{11} & \underline{R}_{12} \\ \underline{R}_{21} & \underline{R}_{22} \end{bmatrix}$$

wherein $R_{11}$, $R_{12}$, $R_{21}$, and $R_{22}$ are sub-matrices of the $\underline{\underline{R}}_y$, and values thereof are: $\underline{R}_{11} = \underline{R}_{22} = \underline{H}_1\underline{H}_1^H + \underline{H}_2\underline{H}_2^H + \sigma_v^2 I_F$, $\underline{R}_{21} = \underline{H}_1\underline{H}_2^H$, $\underline{R}_{12} = \underline{H}_2\underline{H}_1^H$.

According to an equation of a block matrix inversion operation, the inverse matrix $\underline{\underline{R}}_y^{-1}$ of the $\underline{\underline{R}}_y$ in the equation (11) may be represented as:

$$\underline{\underline{R}}_y^{-1} = \begin{bmatrix} \underline{R}_{11}^{-1} + \underline{R}_{11}^{-1}\underline{R}_{12}\underline{S}^{-1}\underline{R}_{21}\underline{R}_{11}^{-1} & -\underline{R}_{11}^{-1}\underline{R}_{12}\underline{S}^{-1} \\ \underline{S}^{-1}\underline{R}_{21}\underline{R}_{11}^{-1} & \underline{S}^{-1} \end{bmatrix} \quad (12)$$

wherein $$\underline{S} = \underline{R}_{22} - \underline{R}_{21}\underline{R}_{11}^{-1}\underline{R}_{12}.$$

In the present embodiment, since $H_2$ and $H_1$ may be Toeplitz matrices, structures of the aforementioned $R_{11}$, $R_{12}$, $R_{21}$, and $R_{22}$ are banded and Toeplitz. Based on documents of note [2], the sub-matrices $R_{11}$, $R_{12}$, $R_{21}$, and $R_{22}$ of the $R_y$ may be approximately represented as:

$$R_{ij} \approx F^H D_{ij} F \qquad (13)$$

wherein $R_{ij}$ represents $R_{11}$, $R_{12}$, $R_{21}$, and $R_{22}$, i,j are positive integers, and $1 \leq i,j \leq 2$.

The $D_{ij}$ in the equation (13) is a diagonal matrix, and a value thereof is $\text{diag}\{F \cdot (S_{ij})_1\}$, wherein $\text{diag}\{x\}$ represents a diagonal matrix, and diagonal elements thereof are composed of elements of a vector $x$. Moreover, $(\cdot)_1$ represents a vector composed of elements of a first column of the matrix, and $F$ represents a discrete Fourier transform (DFT) matrix. Wherein, $F \cdot a$ represents the DFT is performed to a vector $a$, and $F^H \cdot a$ represents an inverse discrete Fourier transform (IDFT) is performed to the vector $a$.

Moreover, $S_{ij}$ may be a circulant matrix approximated by $R_{ij}$. For example, the $R_{ij}$ which is the Toeplitz matrix and has the banded structure may be represented as:

$$\underline{\underline{R_{ij}}} = \begin{bmatrix} r_0 & r_1 & \cdots & \cdots & r_L & 0 & \cdots & \cdots & \cdots & \cdots & \cdots & \cdots & 0 \\ r_{-1} & r_0 & r_1 & \cdots & \cdots & r_L & 0 & \cdots & 0 & 0 & \cdots & \cdots & 0 \\ r_{-2} & r_{-1} & r_0 & r_1 & \cdots & \cdots & r_L & 0 & \cdots & 0 & 0 & \cdots & 0 \\ \vdots & \vdots & r_{-1} & \ddots & \ddots & \ddots & \ddots & \ddots & \ddots & \ddots & \ddots & \ddots & \vdots \\ \vdots & \vdots & \ddots & \ddots & \ddots & \ddots & \ddots & \ddots & \ddots & \ddots & \ddots & \ddots & 0 \\ r_{-L} & \vdots & \ddots & \ddots & \ddots & \ddots & \ddots & \ddots & \ddots & \ddots & \ddots & \ddots & 0 \\ 0 & r_{-L} & \ddots & \ddots & \ddots & \ddots & \ddots & \ddots & \ddots & \ddots & \ddots & \ddots & 0 \\ \vdots & 0 & r_{-L} & \ddots & \ddots & \ddots & \ddots & \ddots & \ddots & \ddots & \ddots & 0 & \vdots \\ \vdots & \ddots & 0 & \ddots & \ddots & \ddots & \ddots & \ddots & \ddots & \ddots & \ddots & r_L & 0 \\ \vdots & \ddots & \ddots & \ddots & \ddots & \ddots & \ddots & \ddots & \ddots & \ddots & \ddots & \ddots & r_L \\ \vdots & \ddots & \ddots & \ddots & \ddots & \ddots & \ddots & \ddots & \ddots & \ddots & \ddots & \ddots & \vdots \\ \vdots & \ddots & \ddots & \ddots & \ddots & \ddots & \ddots & \ddots & \ddots & \ddots & \ddots & r_1 & \vdots \\ \vdots & \ddots & \ddots & \ddots & \ddots & 0 & r_{-L} & \ddots & \ddots & r_{-1} & r_0 & r_1 \\ 0 & 0 & \cdots & \cdots & \cdots & \cdots & 0 & r_{-L} & \cdots & \cdots & \cdots & r_{-1} & r_0 \end{bmatrix},$$

and the circulant-approximated matrix $S_{ij}$ of $R_{ij}$ may be:

$$\underline{\underline{S_{ij}}} = \begin{bmatrix} r_0 & r_1 & \cdots & \cdots & r_L & 0 & \cdots & 0 & 0 & r_{-L} & r_{-L+1} & \cdots & \cdots & r_{-1} \\ r_{-1} & r_0 & r_1 & \cdots & \cdots & r_L & 0 & \cdots & 0 & 0 & r_{-L} & r_{-L+1} & \cdots & r_{-2} \\ r_{-2} & r_{-1} & r_0 & r_1 & \cdots & \cdots & r_L & 0 & \cdots & 0 & 0 & r_{-L} & \ddots & \vdots \\ \vdots & \vdots & r_{-1} & \ddots & \ddots & \ddots & \ddots & \ddots & \ddots & \ddots & \ddots & \ddots & \ddots & r_{-L+1} \\ \vdots & \vdots & \ddots & \ddots & \ddots & \ddots & \ddots & \ddots & \ddots & \ddots & \ddots & \ddots & \ddots & r_{-L} \\ r_{-L} & \vdots & \ddots & \ddots & \ddots & \ddots & \ddots & \ddots & \ddots & \ddots & \ddots & \ddots & \ddots & 0 \\ 0 & r_{-L} & \ddots & \ddots & \ddots & \ddots & \ddots & \ddots & \ddots & \ddots & \ddots & \ddots & \ddots & 0 \\ \vdots & 0 & r_{-L} & \ddots & \ddots & \ddots & \ddots & \ddots & \ddots & \ddots & \ddots & 0 & \vdots \\ 0 & 0 & 0 & \ddots & \ddots & \ddots & \ddots & \ddots & \ddots & \ddots & \ddots & r_L & 0 \\ 0 & \ddots & \ddots & \ddots & \ddots & \ddots & \ddots & \ddots & \ddots & \ddots & \ddots & \ddots & r_L \\ r_L & \ddots & \ddots & \ddots & \ddots & \ddots & \ddots & \ddots & \ddots & \ddots & \ddots & \ddots & \vdots \\ \vdots & \ddots & \ddots & \ddots & \ddots & \ddots & \ddots & \ddots & \ddots & \ddots & \ddots & r_1 & \vdots \\ r_2 & \ddots & \ddots & \ddots & \ddots & 0 & r_{-L} & \ddots & \ddots & r_{-1} & r_0 & r_1 \\ r_1 & r_2 & \cdots & r_L & 0 & 0 & \cdots & 0 & r_{-L} & \cdots & \cdots & r_{-1} & r_0 \end{bmatrix}$$

The DFT matrix $F$ has a feature of $F \times F^H = I$, and according to the equation (13), a following equation is deduced:

$$R_{ij}^{-1} \approx F^H D_{ij}^{-1} F \qquad (14)$$

If the equations (13) and (14) are substituted into the equation (12), a following equation is then obtained:

$$\underline{\underline{R_y^{-1}}} \approx \begin{bmatrix} F^H (\underline{D_{22} D_S^{-1}}) F & F^H (-\underline{D_{12} D_S^{-1}}) F \\ F^H (-\underline{D_{21} D_S^{-1}}) F & F^H (\underline{D_{11} D_S^{-1}}) F \end{bmatrix} \qquad (15)$$

Wherein $D_S = D_{11} D_{22} - D_{21} D_{12}$, and $D_S$ is a diagonal matrix.

If the equation (15) is plugged into the equation (9), a following equation is then obtained:

$$[w_1^T \quad w_2^T]^T = \underline{\underline{R_y^{-1}}} \begin{pmatrix} h_{2,D} \\ h_{1,D} \end{pmatrix} \qquad (16)$$

$$\approx \begin{bmatrix} F^H (\underline{D_{22} D_S^{-1}}) F & F^H (-\underline{D_{12} D_S^{-1}}) F \\ F^H (-\underline{D_{21} D_S^{-1}}) F & F^H (\underline{D_{11} D_S^{-1}}) F \end{bmatrix} \begin{pmatrix} h_{2,D} \\ h_{1,D} \end{pmatrix}$$

If the equation (16) is spread, following equations are then obtained:

$$w_1 \approx \text{IDFT}\{(D_{22} D_S^{-1}) \text{DFT}\{h_{2,D}\} - (D_{12} D_S^{-1}) \text{DFT}\{h_{1,D}\}\} \qquad (17)$$

$$w_2 \approx \text{IDFT}\{(D_{11} D_S^{-1}) \text{DFT}\{h_{1,D}\} - (D_{21} D_S^{-1}) \text{DFT}\{h_{2,D}\}\} \qquad (18)$$

$\text{DFT}\{\cdot\}$ represents the DFT operation, and $\text{IDFT}\{\cdot\}$ represents the IDFT operation. In the present embodiment, to further reduce computation complexity, the DFT operation $\text{DFT}\{\cdot\}$ and the IDFT operations $\text{IDFT}\{\cdot\}$ may also be implemented via a fast Fourier transform (FFT) and an inverse fast Fourier transform (IFFT). Based on the equation (11) $R_{11} = R_{22} = H_1 H_1^H + H_2 H_2^H + \sigma_v^2 I_{2F}$ and $R_{12} = R_{21}^H = H_2 H_1^H$, the equations (17) and (18) may be simplified as:

$$w_1 \approx \text{IDFT}\{\Lambda_A \text{DFT}\{h_{2,D}\} + \Lambda_C \text{DFT}\{h_{1,D}\}\} \qquad (19)$$

$$w_2 \approx \text{IDFT}\{\Lambda_A \text{DFT}\{h_{1,D}\} + \Lambda_C^H \text{DFT}\{h_{2,D}\}\} \qquad (20)$$

Wherein, $\Lambda_A=(D_{11}D_S^{-1})$ and $\Lambda_C=(-D_{12}D_S^{-1})$ are all diagonal matrices.

According to the equations (19) and (20), when the weights $w_1$ and $w_2$ are calculated based on the DFT, the inverse matrix of $R_y$ and multiplication of $R_y^{-1}$ and $$\begin{pmatrix} H_2 \\ H_1 \end{pmatrix}_D$$

are not required, and only values of the diagonal matrices $\Lambda_A$ and $\Lambda_C$, and the DFT and IDFT are required to be calculated.

Figure 6:
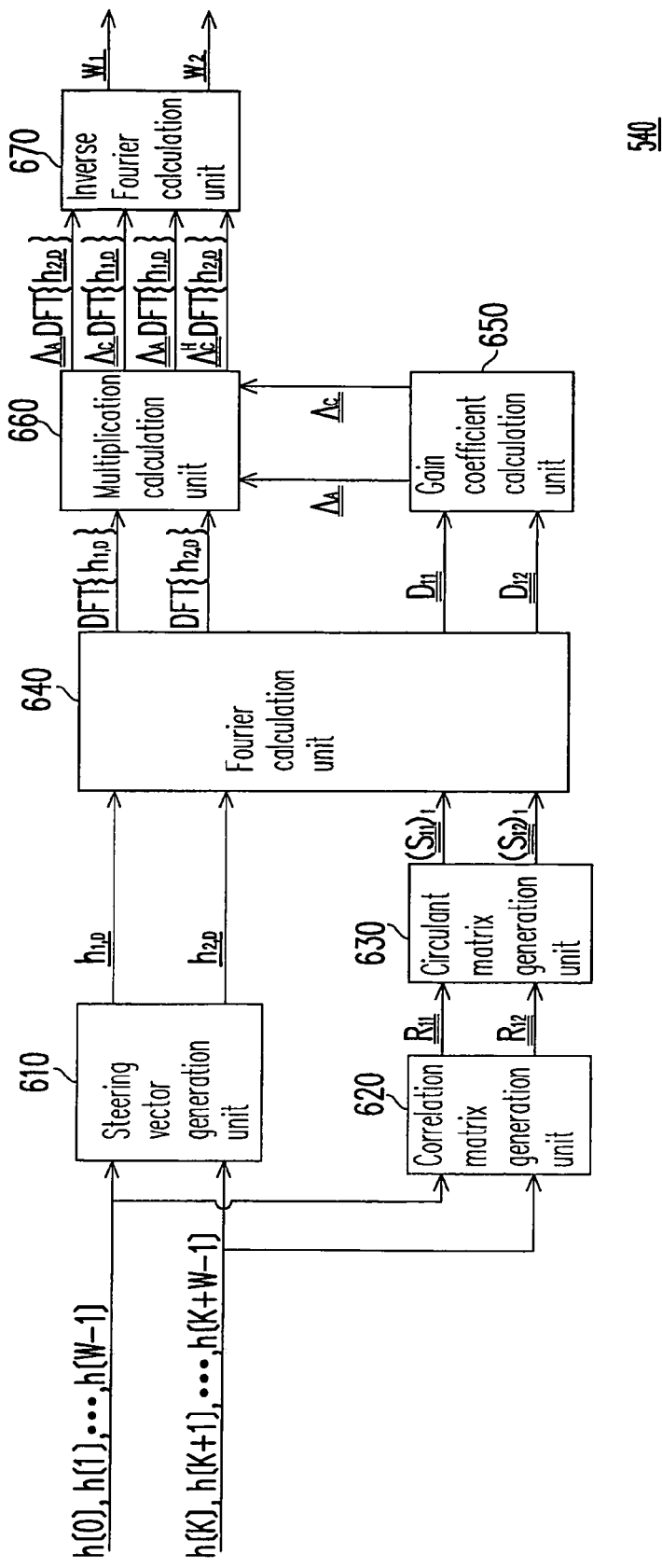
FIG. 6 is a system block diagram illustrating a weight calculation unit 540 according to an embodiment of the present invention.

To fully convey the spirit of the present invention to those skilled in the art, in the following content, an internal system block diagram of the weight calculation unit 540 is provided based on mathematic derivations of the first weights and the second weights. FIG. 6 is a system block diagram illustrating a weight calculation unit 540 according to an embodiment of the present invention. Referring to FIG. 6, the weight calculation unit 540 includes a steering vector generation unit 610, a correlation matrix generation unit 620, a circulant matrix generation unit 630, a Fourier calculation unit 640, a gain coefficient calculation unit 650, a multiplication calculation unit 660 and an inverse Fourier calculation unit 670.

The steering vector generation unit 610 and the correlation matrix generation unit 620 of the weight calculation unit 540 receive gains $h[0], h[1], \ldots, h[W-1]$ of the delay paths of the first cluster 1 and gains $h[K], h[K+1], \ldots, h[K+W-1]$ of the delay paths of the second cluster 2 estimated by the channel estimation unit 530. The steering vector generation unit 610 generates a first steering vector, i.e. the aforementioned $h_{1,D}$ based on the gains $h[0], h[1], \ldots, h[W-1]$ of the delay paths of the first cluster 1, and generates a second steering vector, i.e. the aforementioned $h_{2,D}$ based on the gains $h[K], h[K+1], \ldots, h[K+W-1]$ of the delay paths of the second cluster 2.

The correlation matrix generation unit 620 calculates a first correlation matrix $R_{11}$ and a second correlation matrix $R_{12}$ according to the gains $h[0], h[1], \ldots, h[W-1]$ of the delay paths of the first cluster 1 and the gains $h[K], h[K+1], \ldots, h[K+W-1]$ of the delay paths of the second cluster 2, and according to the equation (11), $R_{11}=H_1H_1^H+H_2H_2^H+\sigma_v^2 I_F$ and $R_{12}=H_2H_1^H$ are obtained.

The circulant matrix generation unit 630 is coupled to the correlation matrix generation unit 620 for calculating an approximate circulant matrix $S_{11}$ of the first correlation matrix $R_{11}$, and calculating an approximate circulant matrix $S_{12}$ of the second correlation matrix $R_{12}$. Calculation of the approximate circulant matrices $S_{11}$ and $S_{12}$ is the same as that of the aforementioned $S_{ij}$. Moreover, the circulant matrix generation unit 630 respectively takes elements on the first columns of the circulant matrices $S_{11}$ and $S_{12}$ as a first approximate vector $(S_{11})_1$ and a second approximate vector $(S_{12})_1$, and outputs $(S_{11})_1$ and $(S_{12})_1$ to the Fourier calculation unit 640. Since in the present embodiment, the circulant matrix generation unit 630 may output the elements on the first columns of the circulant matrices $S_{11}$ and $S_{12}$ as the first approximate vector $(S_{11})_1$ and the second approximate vector $(S_{12})_1$, the circulant matrix generation unit 630 may only calculate the elements on the first columns of the approximate circulant matrices $S_{11}$ and $S_{12}$, and calculation of all other elements within the approximate circulant matrices $S_{11}$ and $S_{12}$ is unnecessary.

The Fourier calculation unit 640 receives the first steering vector $h_{1,D}$, the second steering vector $h_{2,D}$, the first approximate vector $(S_{11})_1$ and the second approximate vector $(S_{12})_1$, and respectively performs the DFT to the first steering vector $h_{1,D}$, the second steering vector $h_{2,D}$, the first approximate vector $(S_{11})_1$ and the second approximate vector $(S_{12})_1$ to obtain $DFT\{h_{1,D}\}$, $DFT\{h_{2,D}\}$, $DFT\{(S_{11})_1\}$ and $DFT\{(S_{12})_1\}$. Moreover, the Fourier calculation unit 640 outputs the transformed steering vectors $DFT\{h_{1,D}\}$ and $DFT\{h_{2,D}\}$ to the multiplication calculation unit 660.

Meanwhile, the Fourier calculation unit 640 generates a first diagonal matrix $D_{11}$ according to the transformed first approximate vector $DFT\{(S_{11})_1\}$, and outputs it to the gain coefficient calculation unit 650. Moreover, the Fourier calculation unit 640 generates a second diagonal matrix $D_{12}$ according to the transformed second approximate vector $DFT\{(S_{12})_1\}$, and outputs it to the gain coefficient calculation unit 650. Wherein, a value of the first diagonal matrix $D_{11}$ may be represented as $D_{11}=\text{diag}\{DFT\{(S_{11})_1\}\}$, and a value of the second diagonal matrix $D_{12}$ may be represented as $D_{12}=\text{diag}\{DFT\{(S_{12})_1\}\}$.

The gain coefficient calculation unit 650 calculates a first coefficient matrix $\Lambda_A$ and a second coefficient matrix $\Lambda_C$, and outputs the calculation results to the multiplication calculation unit 660. Wherein a value of the first coefficient matrix $\Lambda_A$ may be the aforementioned $\Lambda_A=D_{11}D_S^{-1}$, and a value of the second coefficient matrix $\Lambda_C$ may be the aforementioned $\Lambda_C=-D_{12}D_S^{-1}$, wherein $D_S=D_{11}D_{11}-D_{12}D_{12}^H$.

The multiplication calculation unit 660 calculates a multiplication $\Lambda_A DFT\{h_{2,D}\}$ of the first coefficient matrix $\Lambda_A$ and $DFT\{h_{2,D}\}$, a multiplication $\Lambda_C DFT\{h_{1,D}\}$ of the second coefficient matrix $\Lambda_C$ and $DFT\{h_{1,D}\}$, and a multiplication $\Lambda_A DFT\{h_{1,D}\}$ of the first coefficient matrix $\Lambda_A$ and $DFT\{h_{1,D}\}$, and calculates a multiplication $\Lambda_C^H DFT\{h_{2,D}\}$ of a conjugate transpose $\Lambda_C^H$ of the second coefficient matrix $\Lambda_C$ and $DFT\{h_{2,D}\}$, and outputs the multiplications to the inverse Fourier calculation unit 670.

Finally, the inverse Fourier calculation unit 670 performs the IDFT to a summation of the multiplications $\Lambda_A DFT\{h_{2,D}\}$ and $\Lambda_C DFT\{h_{1,D}\}$ for obtaining the first weight $w_1$, and performs the IDFT to a summation of the multiplications $\Lambda_A DFT\{h_{1,D}\}$ and $\Lambda_C^H DFT\{h_{2,D}\}$ for obtaining the second weight $w_2$. Wherein, a value of the first weight $w_1$ may be calculated according to the equation (19), and a value of the second weight $w_2$ may be calculated according to the equation (20).

According to the weight calculation unit 540 and the mathematic equations for calculating the first weight $w_1$ and the second weight $w_2$, during calculation of the first weight $w_1$, not only the delay paths of the first cluster 1 are considered, but the delay paths of the second cluster 2 are also considered. Similarly, during calculation of the second weight $w_2$, the delay paths of the first cluster 1 and the second cluster 2 are also simultaneously taken into consideration. Furthermore, since the delay paths of the second cluster 2 are all taken into consideration during calculation of the first weight $w_1$ and the second weight $w_2$, the first equalizer 510 and the second equalizer 520 may also simultaneously mitigate the interferences of different clusters to the received signal r[m].

Moreover, in the embodiment shown in FIG. 5, though the internal structures of the first equalizer 510 and the second equalizer 520 are assumed to be the FIR filters, those skilled in the art would understand that the internal structures of the first equalizer 510 and the second equalizer 520 may also be infinite impulse response (IIR) filters or other kinds of filters. Moreover, though the weight calculation unit 540 and the channel estimation unit 530 are two independent components, those skilled in the art would understand that the weight calculation unit 540 and the channel estimation unit 530 may also be integrated within one component.

Figure 7:
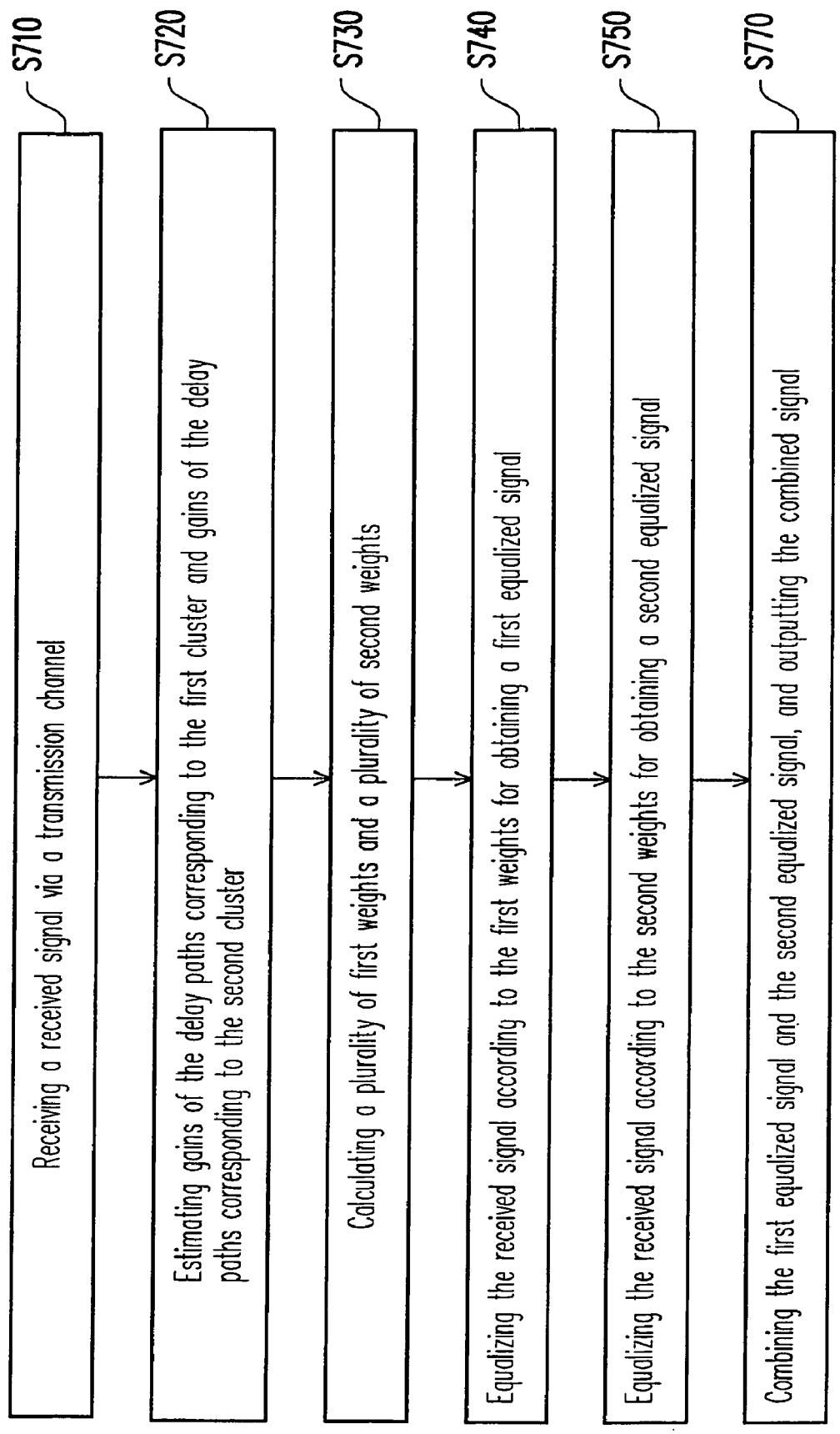
FIG. 7 is a flowchart illustrating an equalization method according to an embodiment of the present invention.

An equalization method may be deduced based on the operation of the equalization apparatus 505 of FIG. 5, as shown in FIG. 7. FIG. 7 is a flowchart illustrating an equalization method according to an embodiment of the present invention. Referring to FIG. 5 and FIG. 7, first, the equalization apparatus 505 receives a received signal r[m] form a transmitter via a transmission channel (step S710). Next, the channel estimation unit 530 estimates the gains of a plurality of the delay paths corresponding to the first cluster 1 and the second cluster 2 within the transmission channel (step S720).

Next, the weight calculation unit 540 calculates the first weights $w_{1,0}, w_{1,1}, w_{1,2}, \ldots, w_{1,F-1}$ and the second weights $w_{2,0}, w_{2,1}, w_{2,2}, \ldots, w_{2,F-1}$ according to the gains of the delay paths corresponding to the first cluster 1 and the second cluster 2 (step S730). In the present embodiment, calculation of the first weights $w_{1,0}, w_{1,1}, w_{1,2}, \ldots, w_{1,F-1}$ and the second weights $w_{2,0}, w_{2,1}, w_{2,2}, \ldots, w_{2,F-1}$ may be performed according to the equation (9), or according to the simplified equations (19) and (20).

Next, the first equalizer 510 equalizes the received signal r[m] according to the first weights $w_{1,0}, w_{1,1}, w_{1,2}, \ldots, w_{1,F-1}$ to obtain a first equalized signal (step S740). The second equalizer 520 equalizes the received signal r[m] according to the second weights $w_{2,0}, w_{2,1}, w_{2,2}, \ldots, w_{2,F-1}$ to obtain a second equalized signal (step S750). In the present invention, since the second equalizer 520 is used for dealing with the interference of the second cluster 2 within the channel, and since a delay time difference between the second cluster 2 and the first cluster 1 is K unit time, in the step S750, the cluster delay unit 521 first delays the received signal r[m] for the K unit time, and outputs a cluster delayed signal r[m−K] to the second equalizer 520, and then the second equalizer 520 performs the equalization. Finally, the combination unit 550 combines the first equalized signal and the second equalized signal, and outputs a combined signal q[m] (step S760).

Figure 1:
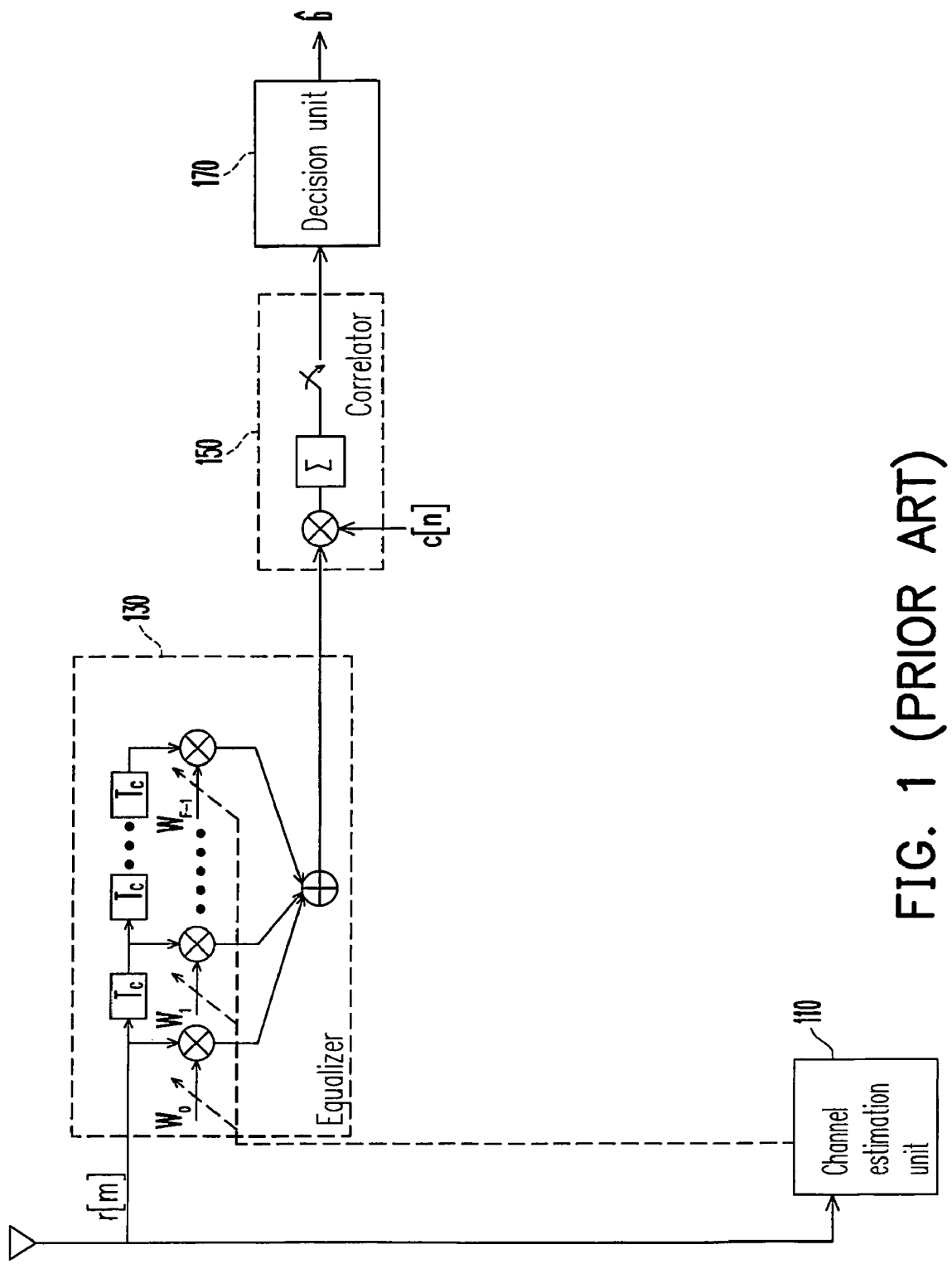
FIG. 1 is a system block diagram of a conventional CDMA receiver applying an equalizer.
Figure 2:
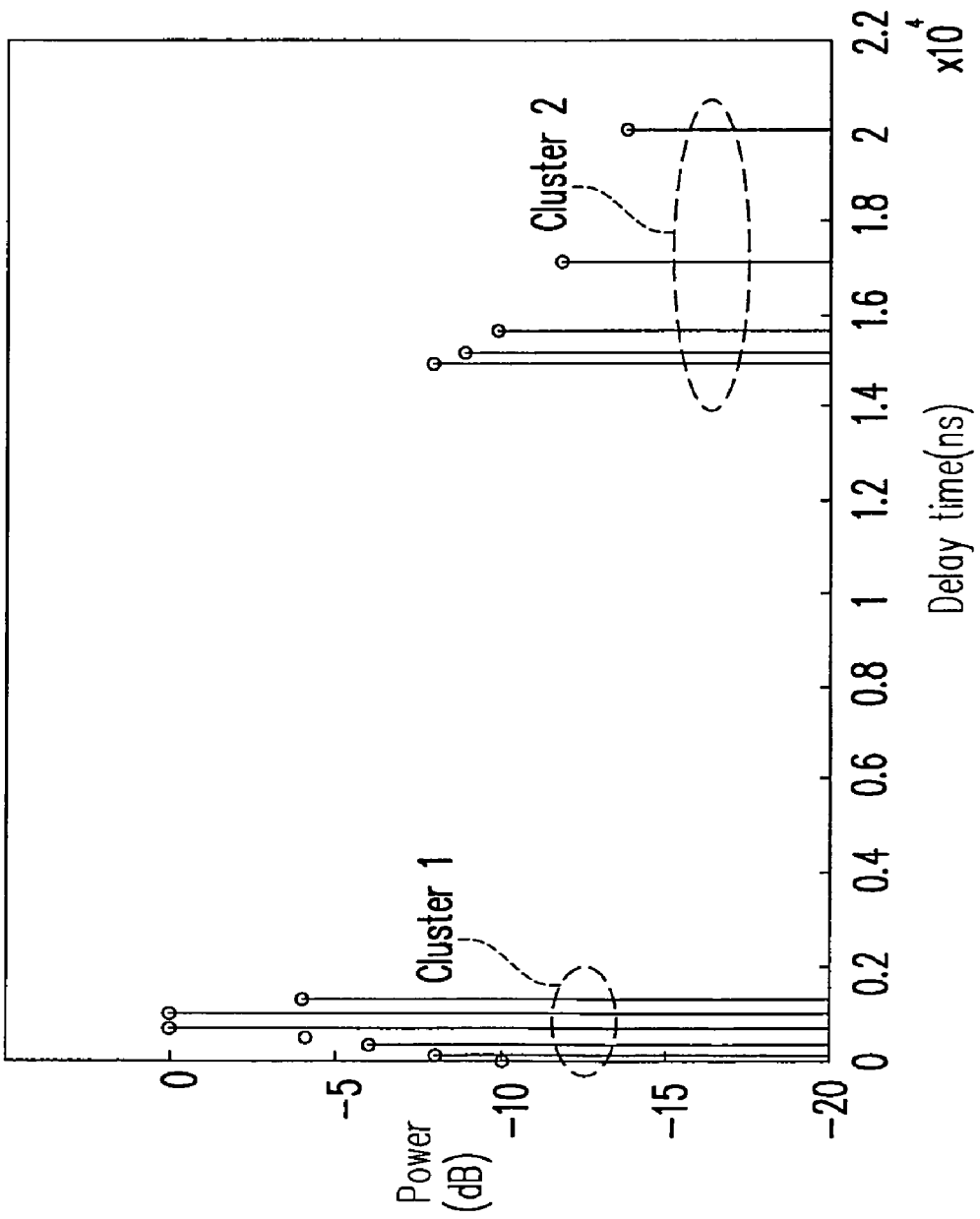
FIG. 2 is a diagram illustrating a channel power delay profile.
Figure 3:
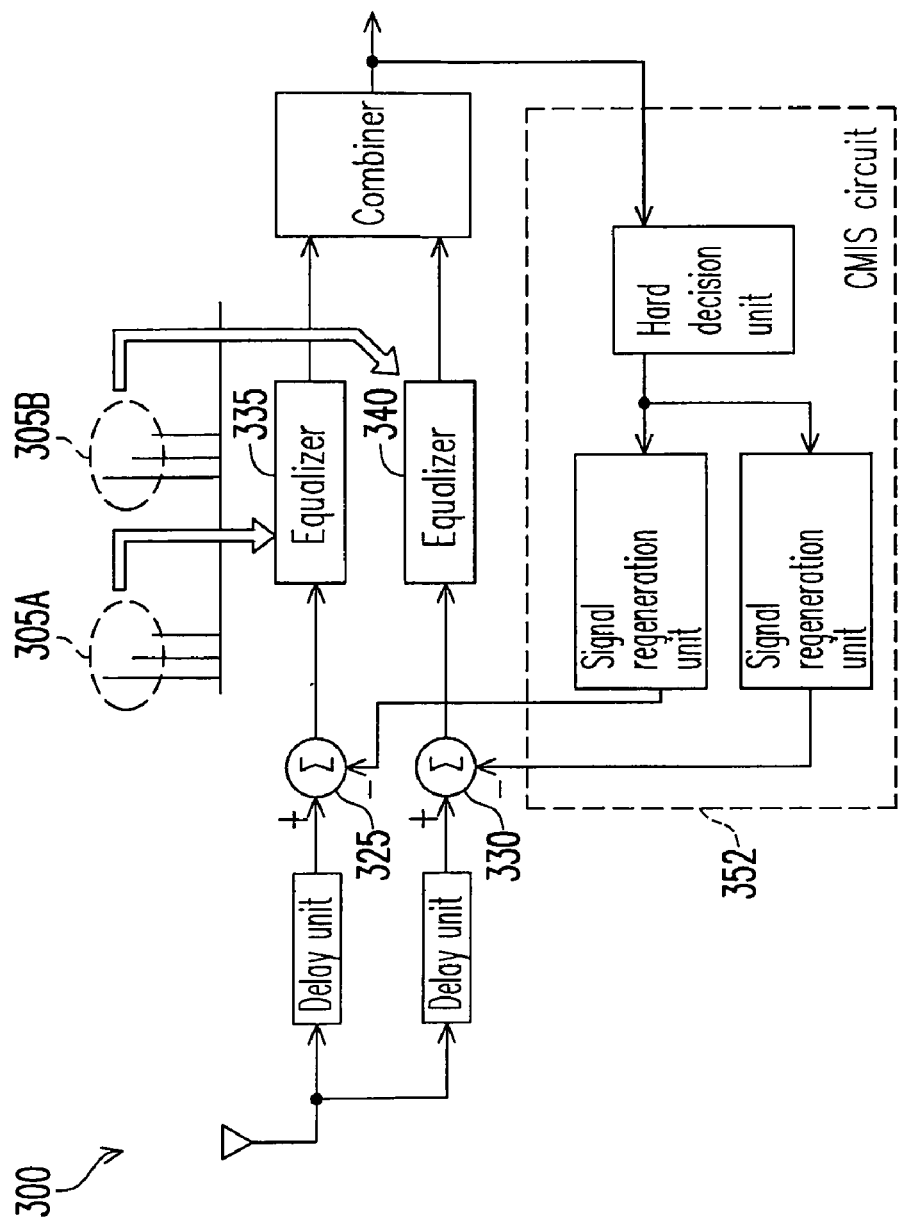
FIG. 3 is a system block diagram illustrating a receiver complying with the U.S patent No. 2006/0109892.
Figure 8:
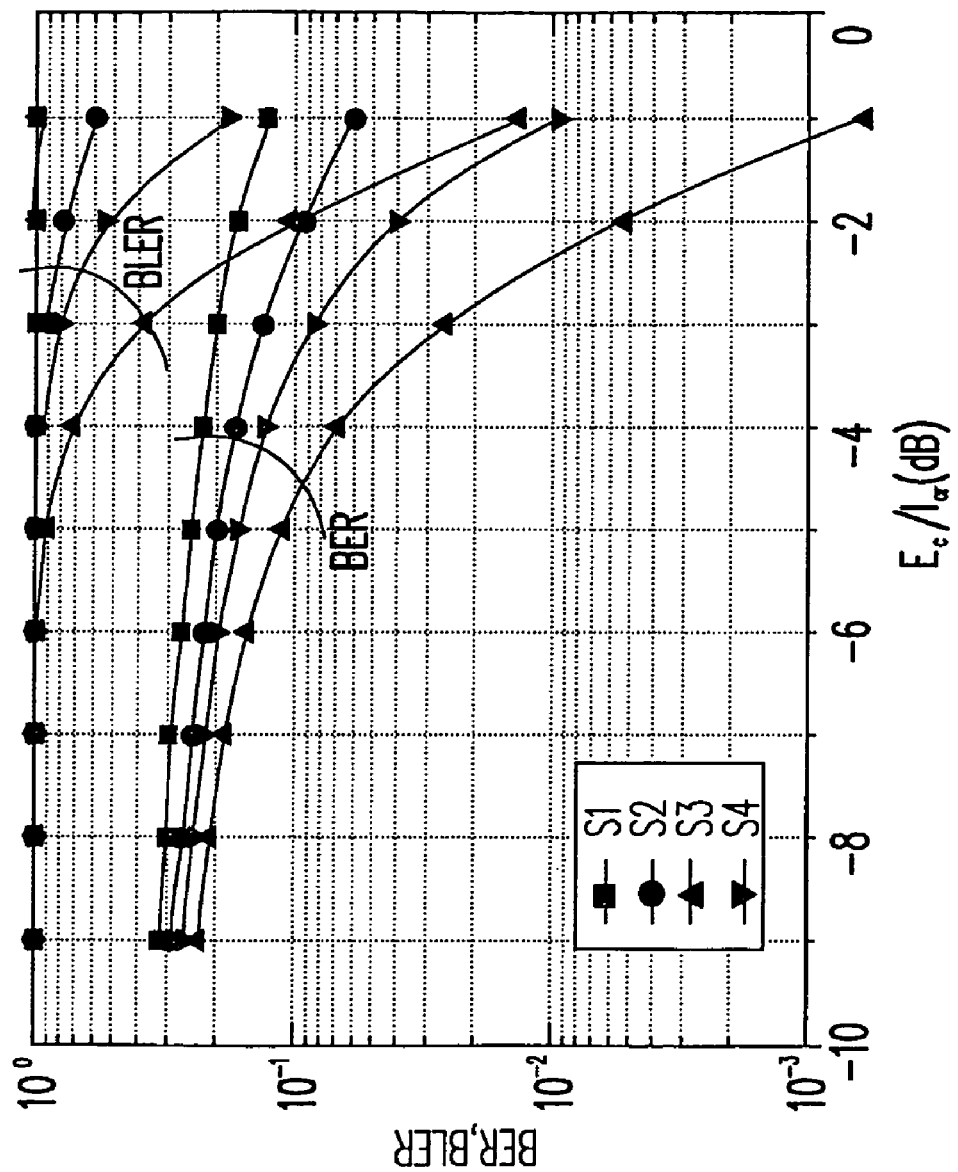
FIG. 8 is a trending diagram of error rates corresponding to ratios ($E_C/I_{or}$) of different chip energies to transmission powers, under a fixed ratio ($I_{or}/I_{oc}$) of the transmission power to interference energy.

In the following content, a performance of the receiver of FIG. 5 is demonstrated by software simulation, and the receiver of FIG. 5 is assumed to be applied to a CDMA system, the demodulation unit 560 is assumed to be a rake receiver, the unit time T is a chip duration $T_C$, and a hilly terrain is assumed to be a channel model of the transmission channel. FIG. 8 is a trending diagram of error rates corresponding to ratios $E_C/I_{or}$ of different chip energies and transmission powers, under a fixed ratio $(I_{or}/I_{oc})$ of the transmission power and interference energy. Referring to FIG. 8, horizontal coordinates thereof represent ratios $E_C/I_{or}$ of chip energies and transmission powers, in the unit of dB, and vertical coordinates thereof represent bit error rates (BER) and block error rates (BLER). There are four different curves S1~S4 in FIG. 8. Wherein, for the curve S1, only the rake receiver is applied. For the curve S2, the receiver with a single equalizer is applied (as shown in FIG. 1), and a length F of the equalizer is 64. For the curve S3, the receiver with a single equalizer is applied (as shown in FIG. 1), and the length F of the equalizer is 256. For the curve S4, the receiver of FIG. 5 is applied, wherein the lengths F of the first equalizer and the second equalizer are both 32, which means that the receiver of the present embodiment and the receiver with the single equalizer with length F=64 have the same hardware complexity. However, the performance of the receiver of the present embodiment is obviously better than the receiver with the single equalizer and with length F=64. Moreover, even if the length of the single equalizer is increased to be F=256, the performance of the receiver thereof is still obviously worse than that of the receiver of the present embodiment.

In an actual wireless channel, since the receiver (for example cell phone or PDA etc.) may be moved, or objects in the environment may be moved, the transmission channel of the receiver is varied constantly. In other words, the number of the clusters within the transmission channel is varied with variation of channel environment, or the delay time difference between the first cluster 1 and the second cluster 2 is varied. Therefore, the present embodiment may apply a present path searching technique for searching the delay time difference between the clusters. For example, a present multi-path searcher (MPS) may scan the transmission channel every a time interval for obtaining a channel power delay profile. In the present embodiment, the MPS may be applied to search the delay time difference between the first cluster 1 and the second cluster 2, so as to adjust the K value within the cluster delay unit 521 of the aforementioned embodiment for dealing with different transmission channels. For example, when the MPS searches the delay time difference between the first cluster 1 and the second cluster 2 is 10 unit time, the receiver may set the K value within the cluster delay unit 521 to be 10.

Figure 9:
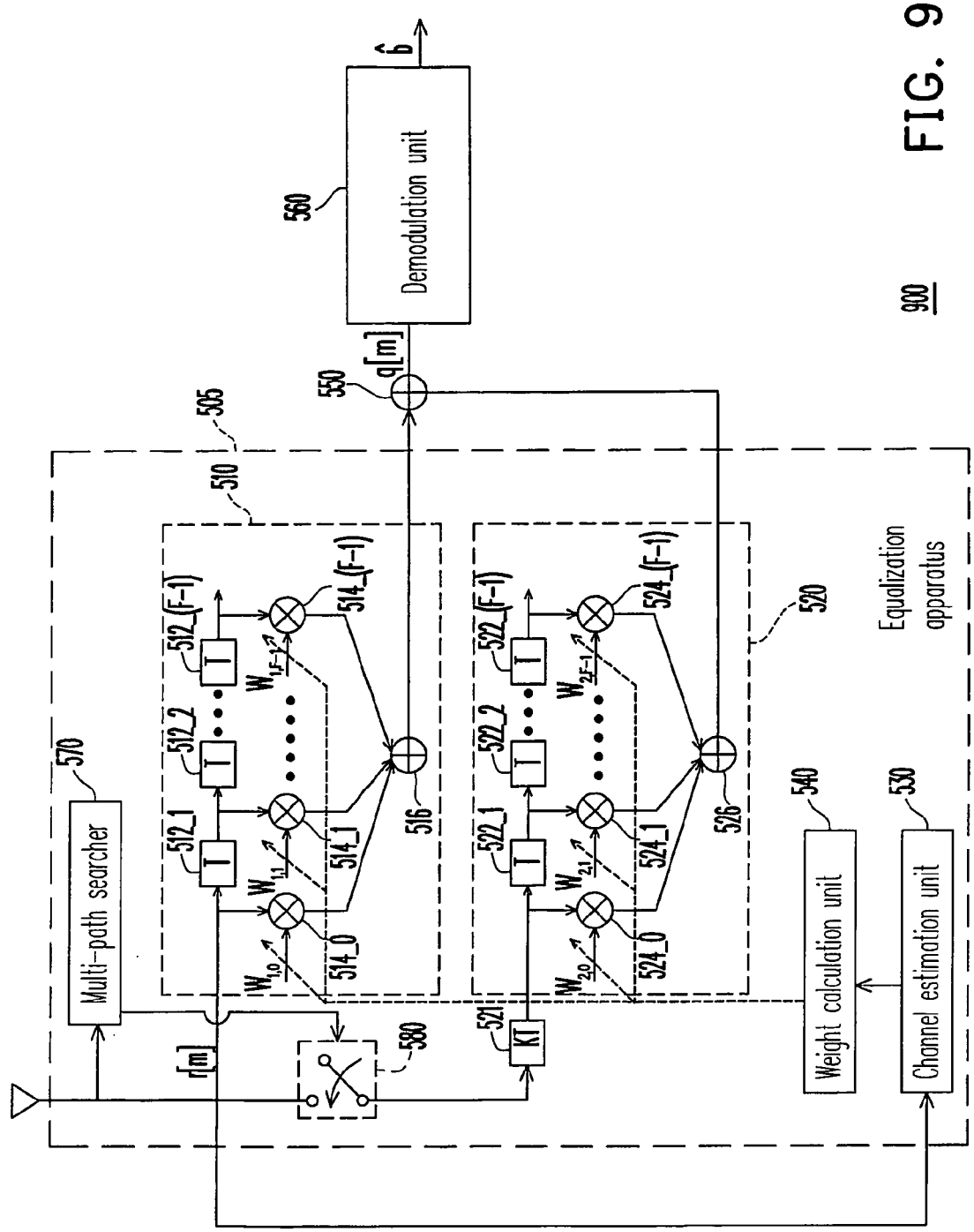
FIG. 9 is a system block diagram illustrating a receiver of an equalization apparatus according to another embodiment of the present invention.
Figure 10:
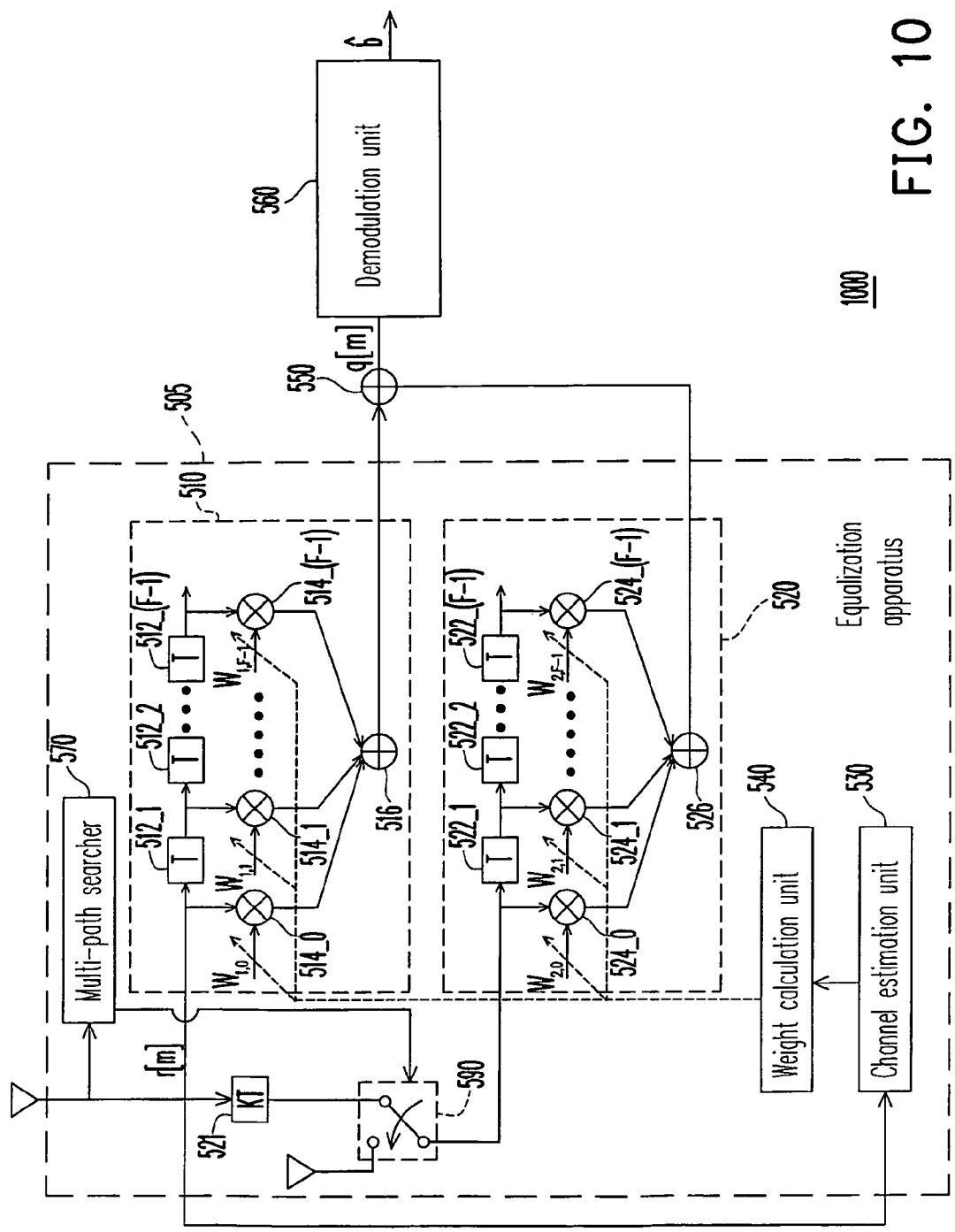
FIG. 10 is a system block diagram illustrating a receiver of an equalization apparatus according to still another embodiment of the present invention.

Moreover, to match different transmission channels, the embodiment shown in FIG. 5 may also be designed as that shown in FIG. 9 and FIG. 10. Referring to FIG. 9, operations of the components within the receiver 900 is similar to that of the receiver 500 of FIG. 5, and therefore detailed description thereof will not be repeated. In the embodiment shown in FIG. 9, an MPS 570 and a switch 580 are added to the receiver 900, and a coupling method thereof is as that shown in FIG. 9. The MPS 570 detects the number of the clusters of the transmission channel, and if the number of the clusters of the transmission channel is 1, in other words, when the transmission channel only has the first cluster 1, the switch 580 is then switched off to shut down the second equalizer 520, so that the equalization apparatus 505 is equivalent to a conventional equalizer. When the number of the clusters of the transmission channel is greater than 1, the switch 580 is then switched on to activate the second equalizer 520. In other words, now, operation of the receiver 900 is the same to that of the embodiment of FIG. 5.

Referring to FIG. 10, operations of the components within the receiver 900 is similar to that of the receiver 500 shown in FIG. 5, and therefore detailed description thereof will not be repeated. In the embodiment shown in FIG. 10, an MPS and a switching unit 590 are added to the receiver 1000, and a coupling method thereof is as that shown in FIG. 10. Wherein, a first input terminal of the switching unit 590 is coupled to the cluster delay unit 521, a second input terminal thereof is coupled to another antenna, and an output terminal thereof is coupled to the second equalizer 520. The MPS 570 detects the number of the clusters of the transmission channel, and if the number of the clusters of the transmission channel is 1, the input terminal of the switching unit 590 is coupled to the other antenna, and the signal received by the other antenna is output to the second equalizer 520. Now, the signal received by the second equalizer 520 is not the one processed by the cluster delay unit 521, but is the signal received from the other antenna. Therefore, now the second equalizer 520 may further take advantage of the spatial diversity to further improve the performance of the receiver. Moreover, when the number of the clusters of the transmission channel is greater than 1, the input terminal of the switching unit 590 is then coupled to the cluster delay unit 521, so that operation of the receiver 1000 is the same as that of the embodiment of FIG. 5.

Moreover, though the other antenna is applied in the embodiment shown in FIG. 10, those skilled in the art would understand that the receiver 1000 may also utilize only one antenna as that of FIG. 5, namely, when the number of the clusters of the transmission channel is 1, the second input terminal of the switching unit 590 and the first equalizer 510 receive the same received signal r[m] from the same antenna, and then the first equalizer 510 and the second equalizer 520 equalize the same received signal r[m].

Figure 11:
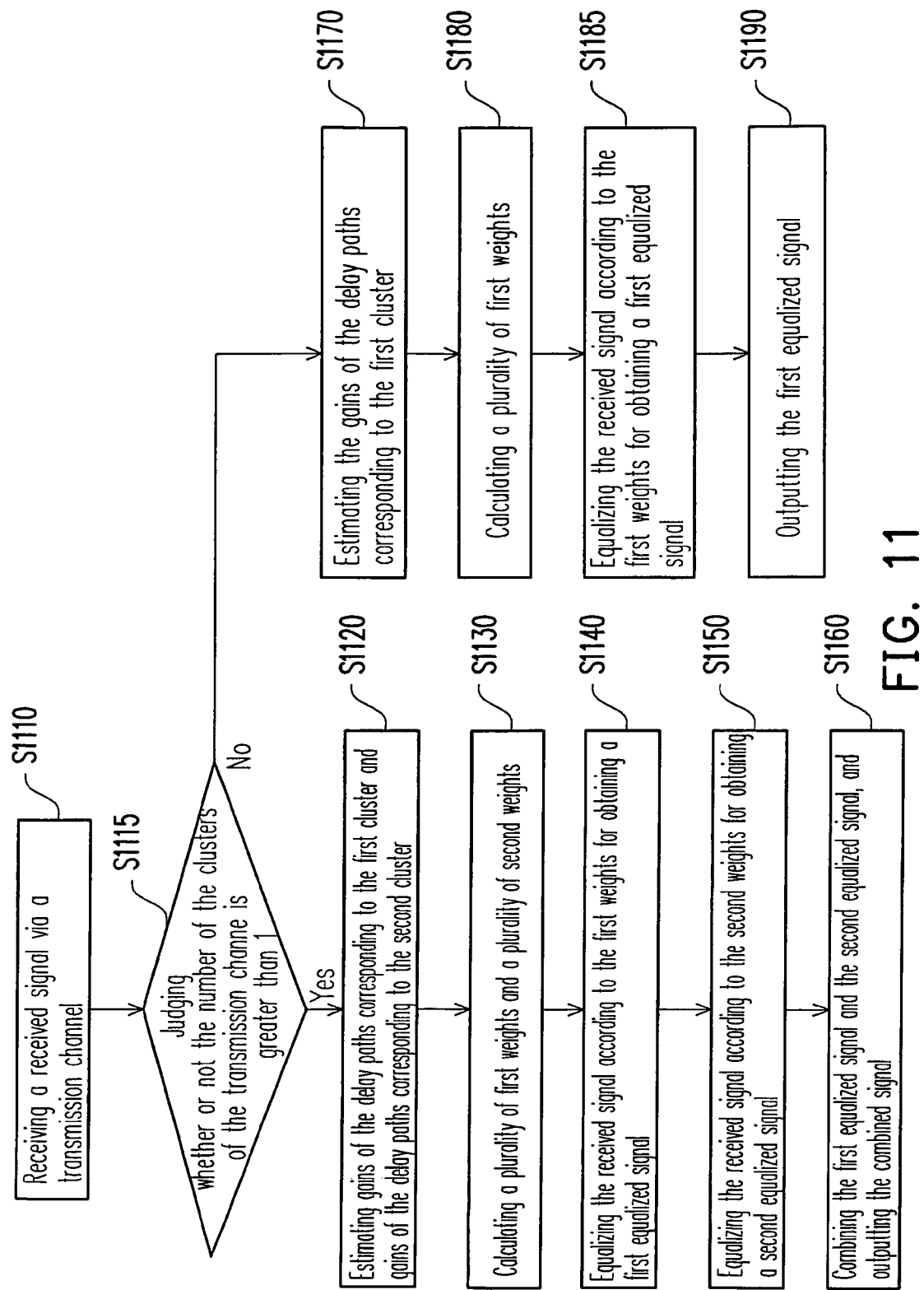
FIG. 11 is a flowchart of an equalization method according to another embodiment of the present invention.

An equalization method is concluded according to the embodiment shown in FIG. 9, as shown in FIG. 11. Referring to FIG. 11, first, the receiver 900 receives the received signal r[m] from the transmitter via the transmission channel (step S1110). Next, the MPS 570 searches the plurality of delay paths of the transmission channel for judging whether or not the number of the clusters of the transmission channel is greater than 1 (step S1115). If the number of the clusters searched by the MPS 570 is greater than 1, steps S1120~S1160 are executed, and the steps S1120~S1160 are the same to the steps S720~S760 of FIG. 7, and therefore detained description thereof is not repeated.

Conversely, if the number of the clusters searched by the MPS 570 is equal to 1, the gains of the delay paths corresponding to the first cluster within the transmission channel are then estimated (step Si 170). Next, the MMSE calculation is performed to the gains of the delay paths corresponding to the first cluster for obtaining the plurality of first weights $w_{1,0}$, $w_{1,1}, w_{1,2}, \ldots, w_{1,F-1}$ (step S1180). Next, the received signal is equalized according to the first weights $w_{1,0}$, $w_{1,1}$, $w_{1,2}, \ldots, w_{1,F-1}$ to obtain a first equalized signal (step S1185). Finally, the first equalized signal is regarded as the combined signal q[m], and the combined signal q[m] is output (S1190).

In summary, in the present invention, two equalizers are applied for respectively equalizing the received signal of delay paths of different clusters, and the weights of the two equalizers are all calculated based on the gains of the whole channel under the MMSE criterion. Therefore, the two equalizers can greatly mitigate the interference of different clusters within the whole channel, and avoid increasing of the lengths of the equalizers unnecessarily. Moreover, the Fourier transform is applied in the present invention for reducing calculation complexities of the first equalizer and the second equalizer, so as to reduce the calculation complexity while the performance of the receiver is improved.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

Note[2]: Zhang, J. Bhatt, T. and Mandyam, G., "Efficient Linear Equalization for High Data Rate Downlink CDMA Signaling," proc. of 37th IEEE Asilomar Conference on signals, Systems, and computers, Monterey, Calif., pp. 141-145, vol. 1, November 2003.

What is claimed is:

1. An equalization apparatus, for receiving a received signal from a transmitter via a transmission channel, wherein the transmission channel has a plurality of delay paths, and the delay paths are at least grouped into a first cluster and a second cluster, the equalization apparatus comprising:
    a channel estimation unit, for estimating gains of the delay paths corresponding to the first cluster, and gains of the delay paths corresponding to the second cluster;
    a weight calculation unit, for performing a minimum mean square error (MMSE) algorithm on the gains of the delay paths corresponding to the first cluster and the second cluster, so as to obtain a plurality of first weights and a plurality of second weights;
    a first equalizer, for equalizing the received signal according to the first weights to obtain a first equalized signal; and
    a second equalizer, for equalizing the received signal according to the second weights to obtain a second equalized signal,
    wherein the received signal corresponding to a time index m is represented by r[m], and the number of the first weights is F respectively represented as $w_{1,0}$, $w_{1,1}$, $w_{1,2}, \ldots, w_{1,F-1}$, and the first equalizer comprises:
        a plurality of first delay units, for sequentially delaying the received signal r[m] for the unit time, and respectively outputting a plurality of first delayed signals r[m−1], r[m−2], ..., r[m−F+1];
        a plurality of first multiplication units, for respectively multiplying the received signal r[m] and the first delayed signals r[m−1], r[m−2], ..., r[m−F−1] with conjugations of the first weights $w_{1,0}^*$, $w_{1,1}^*$, $w_{1,2}^*, \ldots, w_{1,F-1}^*$ to obtain a plurality of first multiplied signals $w_{1,0}^* \cdot r[m]$, $w_{1,1}^* \cdot r[m-1]$, $w_{1,2}^* \cdot r[m-2], \ldots, w_{1,F-1}^* \cdot r[m-F+1]$; and
        a first adder, for adding the first multiplied signals $w_{1,0}^* \cdot r[m]$, $W_{1,1}^* \cdot r[m-1]$, $w_{1,2}^* \cdot r[m-2], \ldots, w_{1,F-1}^* \cdot r[m-1]$ to obtain the first equalized signal.

2. The equalization apparatus as claimed in claim 1 further comprising:
    a combination unit, for combining the first equalized signal and the second equalized signal, and outputting a combined signal.

3. The equalization apparatus as claimed in claim 1, wherein the channel estimation unit has a channel estimation window represented by W, the gains of the delay paths corresponding to the first cluster estimated by the channel estimation unit are represented as h[0], h[1], ..., h[W−1], the gains of the delay paths corresponding to the second cluster estimated by the channel estimation unit are represented as h[K], h[K+1], ..., h[K+W−1], a delay time difference between the first cluster and the second cluster is represented by K, the first weights are respectively represented by $w_{1,0}$, $w_{1,1}, w_{1,2}, \ldots, w_{1,F-1}$, the second weights are respectively represented by $w_{2,0}, w_{2,1}, w_{2,2}, \ldots, W_{2,F-1}$, and the received signal corresponding to a time index m is represented by r[m], the weight calculation unit calculates the first weights and the second weights by the equation $$[\underline{w_1}^T \quad \underline{w_2}^T]^T = \underline{\underline{R_y}}^{-1}\left(\frac{\underline{H_2}}{\underline{H_1}}\right)_D,$$

wherein a superscript T represents a matrix transposition operator, a superscript −1 represents an inverse matrix calculation operator, $\underline{w_1} = \lfloor w_{1,0} \; w_{1,1} \ldots w_{1,F-1} \rfloor$, $\underline{w_2} = \lfloor w_{2,0} \; w_{2,1} \ldots w_{2,F-1} \rfloor$, $\underline{\underline{R_y}}$ represents an autocorrelation matrix of a received vector $\underline{y[m]}$, the received vector $\underline{y}[m] = (\underline{r}^T[m] \; \underline{r}^T[m-K])^T$, $$\underline{y}[m] = (\underline{r}^T[m] \quad \underline{r}^T[m-K])^T,$$

$$\underline{r}[m] = (r[m] \quad r[m-1] \quad \cdots \quad r[m-F+1])^T,$$

$$\underline{r}[m-K] = (r[m-K] \quad r[m-K-1] \quad \cdots \quad r[m-K-F+1])^T,$$

$$\underline{\underline{H_1}} = \begin{bmatrix} h[0] & h[1] & \cdots & \cdots & h[W-1] & 0 & \cdots & \cdots & 0 \\ 0 & h[0] & h[1] & \cdots & h[W-2] & h[W-1] & 0 & \cdots & 0 \\ \vdots & 0 & \ddots & \ddots & \ddots & \ddots & \ddots & \ddots & \vdots \\ \vdots & \vdots & \ddots & \ddots & \ddots & \ddots & \ddots & \ddots & 0 \\ 0 & 0 & \cdots & 0 & h[0] & h[1] & \cdots & \cdots & h[W-1] \end{bmatrix},$$

$$\underline{\underline{H_2}} = \begin{bmatrix} h[K] & h[K+1] & \cdots & \cdots & h[K+W-1] & 0 & \cdots & \cdots & 0 \\ 0 & h[K] & h[K+1] & \cdots & h[K+W-2] & h[K+W-1] & 0 & \cdots & 0 \\ \vdots & 0 & \ddots & \ddots & \ddots & \ddots & \ddots & \ddots & \vdots \\ \vdots & \vdots & \ddots & \ddots & \ddots & \ddots & \ddots & \ddots & 0 \\ 0 & 0 & \cdots & 0 & h[K] & h[K+1] & \cdots & \cdots & h[K+W-1] \end{bmatrix},$$

$$\left( \frac{\underline{\underline{H_2}}}{\underline{\underline{H_1}}} \right)_D$$

represents a vector stacked by elements of $D^{th}$ columns of $H_2$ and $H_1$, and D is a positive integer less than or equal to $F+W-1$.

4. The equalization apparatus as claimed in claim 3, wherein the weight calculation unit calculates the first weights and the second weights according to $w_1 \approx \text{IDFT}\{(D_{22}D_S^{-1})\text{DFT}\{h_{2,D}\} - (D_{12}D_S^{-1})\text{DFT}\{h_{1,D}\}\}$, and $w_2 \approx \text{IDFT}\{(D_{11}D_S^{-1})\text{DFT}\{h_{1,D}\} - (D_{21}D_S^{-1})\text{DFT}\{h_{2,D}\}\}$, wherein IDFT represents inverse discrete Fourier transform, and DFT represents discrete Fourier transform, $D_{11}, D_{12}, D_{21}$ and $D_{22}$ are represented by a diagonal matrix $D_{ij}$, and a value thereof is diag$\{F \cdot (S_{ij})_1\}$, wherein i, j are positive integers, and $1 \leq i, j \leq 2$, diag$\{x\}$ represents a diagonal matrix, and diagonal elements thereof are composed of elements of a vector x, $(\cdot)_1$ represents a vector composed of elements of a first column of the matrix, F represents a DFT matrix, $S_{ij}$ is a circulant matrix approximated by $R_{ij}$, $R_{ij} \in \{R_{11}, R_{12}, R_{21}, R_{22}\}$, $R_{11} = R_{22} = H_1 H_1^H + H_2 H_2^H + \sigma_v^2 I_F$, $R_{12} = R_{21}^H = H_2 H_1^H$, $\sigma_v^2$ represents a variance of a Gaussian noise within the transmission channel, $I_F$ represents a identity matrix with a dimension of F×F.

5. The equalization apparatus as claimed in claim 3, wherein the weight calculation unit calculates the first weights and the second weights according to $w_1 \approx \text{IDFT}\{\Lambda_A \text{DFT}\{h_{2,D}\} + \Lambda_C \text{DFT}\{h_{1,D}\}\}$, and $w_2 \approx \text{IDFT}\{\Lambda_A \text{DFT}\{h_{1,D}\} + \Lambda_C^H \text{DFT}\{h_{2,D}\}\}$, wherein IDFT represents inverse discrete Fourier transform, and DFT represents discrete Fourier transform, $\Lambda_A = (D_{11}D_S^{-1})$ and $\Lambda_C = (-D_{12}D_S^{-1})$ are diagonal matrices, wherein $D_S = D_{11}D_{11} - D_{12}D_{12}^H$, $D_{11} = \text{diag}\{F \cdot (S_{11})_1\}$, and $D_{12} = \text{diag}\{F \cdot (S_{12})_1\}$, diag$\{x\}$ represents a diagonal matrix, and diagonal elements thereof are composed of elements of a vector x, moreover, $(\cdot)_1$ represents a vector composed of elements of a first column of the matrix, F represents a DFT matrix, $S_{11}$ and $S_{12}$ are circulant matrices approximated by $R_{11}$ and $R_{12}$, respectively, and $_a 2$ $R_{11} = H_1 H_1^H + H_2 H_2^H + \sigma_v^2 I_F$, $R_{12} = H_2 H_1^H$, wherein $\sigma_v^2$ represents a variance of a Gaussian noise within the transmission channel, $I_F$ represents a identity matrix with a dimension of F×F.

6. The equalization apparatus as claimed in claim 3, wherein the weight calculation unit comprises:

a steering vector generation unit, for constructing a first steering vector from the gains $h[0], h[1], \ldots, h[W-1]$ of the delay paths of the first cluster estimated by the channel estimation unit, and constructing a second steering vector from the gains $h[K], h[K+1], \ldots, h[K+W-1]$ of the delay paths of the second cluster estimated by the channel estimation unit, wherein the first steering vector is a vector composed of elements on a $D^{th}$ column of the matrix $H_1$, and is represented by $h_{1,D}$, the second steering vector is a vector composed of elements on a $D^{th}$ column of the matrix $H_2$, and is represented by $h_{2,D}$;

a correlation matrix generation unit, for calculating a first correlation matrix and a second correlation matrix, wherein the first correlation matrix is represented by $R_{11}$, and the second correlation matrix is represented by $R_{12}$, and values thereof are $R_{11} = H_1 H_1^H + H_2 H_2^H + \sigma_v^2 I_F$, $R_{12} = H_2 H_1^H$, $\sigma_v^2$ represents a variance of a Gaussian noise within the transmission channel, $I_F$ represents a identity matrix with a dimension of F×F;

a circulant matrix generation unit, for calculating a first approximate vector and a second approximate vector, wherein the first approximate vector is a vector composed of elements on a first column of a circulant-approximate matrix of the first correlation matrix $R_{11}$, the circulant-approximate matrix of the first correlation matrix $R_{11}$ is represented by $S_{11}$, the first approximate vector is represented by $(S_{11})_1$, the second approximate vector is a vector composed of elements on a first column of a circulant-approximate matrix of the second correlation matrix $R_{12}$, the circulant-approximate matrix of the second correlation matrix $R_{12}$ is represented by $S_{12}$, the second approximate vector is represented by $(S_{12})_1$, $(\cdot)_1$ represents a vector composed of elements of a first column of the matrix;

a Fourier calculation unit, for respectively performing Fourier transform to the first steering vector $h_{1,D}$, the second steering vector $h_{2,D}$, the first approximate vector $(S_{11})_1$ and the second approximate vector $(S_{12})_1$ to obtain DFT$\{h_{1,D}\}$, DFT$\{h_{2,D}\}$, DFT$\{(S_{11})_1\}$ and DFT$\{(S_{12})_1\}$, and forming a first diagonal matrix based on DFT$\{(S_{11})_1\}$ and forming a second diagonal matrix based on DFT$\{(S_{12})_1\}$, wherein, the first diagonal matrix is representd by $D_{11}$, and a value thereof is $D_{11}=\text{diag}\{\text{DFT}\{(S_{11})_1\}\}$, the second diagonal matrix is represented by $D_{12}$, and a value thereof is $D_{12}=\text{diag}\{\text{DFT}\{(S_{12})_1\}\}$, and DFT represents discrete Fourier transform;

a gain coefficient calculation unit, for calculating a first coefficient matrix and a second coefficient matrix, wherein the first coefficient matrix is represented by $\Lambda_A$, and a value thereof is $\Lambda_A = D_{12}D_S^{-1}$, and the second coefficient matrix is represented by $\Lambda_C$, and a value thereof is $\Lambda_C = -D_{12}D_S^{-1}$, $D_S = D_{11}D_{11} - D_{12}D_{12}^H$;

a multiplication calculation unit, for calculating a multiplication $\Lambda_A\text{DFT}\{h_{2,D}\}$ of the first coefficient matrix $\Lambda_A$ and DFT$\{h_{2,D}\}$, a multiplication $\Lambda_C\text{DFT}\{h_{1,D}\}$ of the second coefficient matrix $\Lambda_C$ and DFT$\{h_{1,D}\}$, and a multiplication $\Lambda_A\text{DFT}\{h_{1,D}\}$ of the first coefficient matrix $\Lambda_A$ and DFT$\{h_{1,D}\}$, and calculating a multiplication $\Lambda_C^H\text{DFT}\{h_{2,D}\}$ of a conjugate transpose $\Lambda_C^H$ of the second coefficient matrix $\Lambda_C$ and DFT$\{h_{2,D}\}$; and an inverse Fourier calculation unit, for performing IDFT to a summation of the multiplications $\Lambda_A\text{DFT}\{h_{2,D}\}$ and $\Lambda_C\text{DFT}\{h_{1,D}\}$ to obtain the first weights $w_1$, and performing IDFT to a summation of the multiplications $\Lambda_A\text{DFT}\{h_{1,D}\}$ and $\Lambda_C^H\text{DFT}\{h_{2,D}\}$ to obtain the second weights $w_2$.

7. The equalization apparatus as claimed in claim 1, wherein the equalization apparatus further comprises:
a cluster delay unit, for delaying the received signal r[m] for K unit time to obtain a first cluster delayed signal r[m−K].

8. The equalization apparatus as claimed in claim 7, wherein the number of the second weights is F, and the second weights are respectively represented as $w_{2,0}, w_{2,1}, w_{2,2}, \ldots, w_{2,F-1}$, and the second equalizer comprises:
a plurality of second delay units, for sequentially delaying the cluster delayed signals r[m−K] for the unit time, and respectively outputting a plurality of second delayed signals, wherein the second delayed signals are represented by r[m−K−1], r[m−K−2], ..., r[m−K−F+1];
a plurality of second multiplication units, for respectively multiplying the cluster delayed signals r[M−K] and the second delayed signals r[m−K−1], r[m−K−2], ..., r[m−K−F+1] with conjugations of the corresponding second weights $w_{2,0}^*, w_{2,1}^*, w_{2,2}^*, \ldots, w_{2,F-1}^*$ to obtain a plurality of second multiplied signals $w_{2,0}^* \cdot r[m-K]$, $w_{2,1}^* \cdot r[m-K-1]$, $w_{2,2}^* \cdot r[m-K-2]$, ..., $W_{2,F-1}^* \cdot r[m-K-F+1]$; and
a second adder, for adding the second multiplied signals $w_{2,0}^* \cdot r[m-K]$, $w_{2,1}^* \cdot r[m-K-1]$, $w_{2,2}^* \cdot r[m-K-2]$, ..., $w_{2,F-1}^* \cdot r[m-K-F+1]$ to obtain the second equalized signal.

9. The equalization apparatus as claimed in claim 7 further comprising:
a multi-path searcher (MPS), for searching the delay paths within the transmission channel, and judging a number of the cluster within the transmission channel according to a delay time of the delay paths.

10. The equalization apparatus as claimed in claim 9, wherein the MPS further searches a delay time difference between the first cluster and the second cluster, and the delay time difference is represented by K.

11. The equalization apparatus as claimed in claim 9 further comprising:
a switch, with one end thereof coupled to the received signal, and another end thereof coupled to the cluster delay unit, wherein the switch is turned off when the MPS judges the number of the clusters within the transmission channel is 1, and the switch is turned on when the MPS judges the number of the clusters within the transmission channel is greater than 1.

12. The equalization apparatus as claimed in claim 9 further comprising:
a switching unit, having a first input terminal, a second input terminal and an output terminal, wherein the first input terminal receives the cluster delayed signal r[m−K], the second input terminal receives the received signal r[m], and the output terminal is coupled to the second equalizer, when the MPS judges the number of the clusters within the transmission channel is 1, the second input terminal of the switching unit is then coupled to the output terminal, and when the MPS judges the number of the clusters within the transmission channel is greater 1, the first input terminal of the switching unit is then coupled to the output terminal.

13. An equalization method, comprising:
receiving a received signal from a transmitter via a transmission channel, wherein the transmission channel has a plurality of delay paths, and the delay paths are at least grouped into a first cluster and a second cluster;
estimating gains of the delay paths corresponding to the first cluster and gains of the delay paths corresponding to the second cluster;
performing an MMSE algorithm on the gains of the delay paths corresponding to the first cluster and the second cluster for obtaining a plurality of first weights and a plurality of second weights;
equalizing the received signal according to the first weights for obtaining a first equalized signal; and
equalizing the received signal according to the second weights for obtaining a second equalized signal,
wherein the received signal corresponding to a time index m is represented by r[m], and the number of the first weights is F, and the first weights are respectively represented as $w_{1,0}, w_{1,1}, w_{1,2}, \ldots, w_{1,F-1}$, wherein the step of equalizing the received signal according to the first weights to obtain the first equalized signal comprises:
sequentially delaying the received signal r[m] for the unit time, and respectively outputting a plurality of first delayed signals, wherein the first delayed signals are represented by r[m−1], r[m−2], ..., r[m−F+1];
respectively multiplying the received signal r[m] and the first delayed signals r[m−1], r[m−2], ..., r[m−F+1] with conjugations of the first weights $w_{1,0}^*, w_{1,1}^*, w_{1,2}^*, \ldots, w_{1,F-1}^*$ to obtain a plurality of first multiplied signals $w_{1,0}^* \cdot r[m]$, $w_{1,1}^* \cdot r[m-1]$, $w_{1,2}^* \cdot r[m-2]$, ..., $w_{1,F-1}^* \cdot r[m-F+1]$; and
adding the first multiplied signals $w_{1,0}^* \cdot r[m]$, $w_{1,1}^* \cdot r[m-]$, $w_{1,2}^* \cdot r[m-2]$, ..., $w_{1,F-1}^* \cdot r[m-F+1]$ to obtain the first equalized signal.

14. The equalization method as claimed in claim 13 further comprising:
combining the first equalized signal and the second equalized signal, and outputting a combined signal.

15. The equalization method as claimed in claim 13, wherein the gains of the delay paths corresponding to the first cluster are represented as h[0], h[1], . . . , h[W−1], the gains of the delay paths corresponding to the second cluster are represented as h[K], h[K+1], . . . , h[K+W−1], a delay time difference between the first cluster and the second cluster is represented by K, the first weights are respectively represented by $w_{1,0}, w_{1,1}, w_{1,2}, \ldots, w_{1,F-1}$, the second weights are respectively represented by $w_{2,0}, w_{2,1}, w_{2,2}, \ldots, w_{1,F-1}$, and the received signal corresponding to a time index m is represented by r[m], wherein the step of performing the MMSE algorithm to obtain the first weights and the second weights comprises:

calculating the first weights and the second weights according $$[w_1^T \quad w_2^T]^T = \underline{\underline{R_y}}^{-1} \left( \frac{\underline{\underline{H_2}}}{\underline{\underline{H_1}}} \right)_D,$$

wherein superscript T represents a matrix transposition operator, superscript −1 represents an inverse matrix calculation operator, $w_1 = [w_{1,0} \ w_{1,1} \ \ldots \ w_{1,F-1}]$, $w_2 = [w_{2,0} \ w_{2,1} \ \ldots \ w_{2,F-1}]$, $R_y$ represents an autocorrelation matrix of a received vector y[m], the received vector $\underline{y}[m] = (\underline{r}^T[m] \underline{r}^T[m-K])^T,$ $\underline{r}[m] = (r[m] r[m-1] \ldots r[m-F+1])^T,$ $\underline{r}[m-K] = (r[m-K] r[m-K-1] \ldots r[m-F+1])^T,$ $$\underline{\underline{H_1}} = \begin{bmatrix} h[0] & h[1] & \ldots & \ldots & h[W-1] & 0 & \ldots & \ldots & 0 \\ 0 & h[0] & h[1] & \ldots & h[W-2] & h[W-1] & 0 & \ldots & 0 \\ \vdots & 0 & \ddots & \ddots & \ddots & & \ddots & \ddots & \vdots \\ \vdots & \vdots & \ddots & \ddots & \ddots & & & \ddots & 0 \\ 0 & 0 & \ldots & 0 & h[0] & h[1] & \ldots & \ldots & h[W-1] \end{bmatrix},$$

$$\underline{\underline{H_2}} = \begin{bmatrix} h[K] & h[K+1] & \ldots & \ldots & h[K+W-1] & 0 & \ldots & \ldots & 0 \\ 0 & h[K] & h[K+1] & \ldots & h[K+W-2] & h[K+W-1] & 0 & \ldots & 0 \\ \vdots & 0 & \ddots & \ddots & \ddots & & \ddots & \ddots & \vdots \\ \vdots & \vdots & \ddots & \ddots & \ddots & & & \ddots & 0 \\ 0 & 0 & \ldots & 0 & h[K] & h[K+1] & \ldots & \ldots & h[K+W-1] \end{bmatrix},$$

$\left( \frac{\underline{\underline{H_2}}}{\underline{\underline{H_1}}} \right)_D$ represents a vector stacked by elements of D columns of $H_2$ and $H_1$, and D is any positive integer less than or equal to F+W−1.

16. The equalization method as claimed in claim 15, wherein the step of performing the MMSE algorithm for obtaining the first weights and the second weights comprises:

calculating the first weights and the second weights according to $w_1 \approx \text{IDFT}\{(D_{22}D_S^{-1})\text{DFT}\{h_{2,D}\} - (D_{12}D_S^{-1})\text{DFT}\{h_{1,D}\}\}$, and $w_2 \approx \text{IDFT}\{(\overline{D_{11}D_S^{-1}})\text{DFT}\{h_{1,D}\} - (D_{21}D_S^{-1})\text{DFT}\{h_{2,D}\}\}$, wherein IDFT represents inverse discrete Fourier transform, and DFT represents discrete Fourier transform, $D_{11}, D_{12}$, $D_{21}$ and $D_{22}$ are represented by a diagonal matrix $D_{ij}$, and a value thereof is diag$\{\underline{F} \cdot (S_{ij})_1\}$, wherein i, j are positive integers, and $1 \leq i, j \leq 2$, diag$\{x\}$ represents a diagonal matrix, and diagonal elements thereof are composed of elements of a vector x, $(\cdot)_1$ represents a vector composed of elements of a first column of the matrix, F represents a DFT matrix, $S_{ij}$ is a circulant matrix approximated by $R_{ij}$, $R_{ij} \in \{R_{11}, R_{12}, R_{21}, R_{22}\}$, $R_{11} = R_{22} = H_1H_1^H + H_2H_2^H + \sigma_v^2 I_F$, $R_{12} = R_{21}^H = H_2H_1^H$, $\sigma_v^2$ represents a variance of a Gaussian noise within the transmission channel, $I_F$ represents a identity matrix with a dimension of F×F.

17. The equalization method as claimed in claim 15, wherein the step of performing the MMSE algorithm for obtaining the first weights and the second weights comprises:

calculating the first weights and the second weights according to $w_1 \approx \text{IDFT}\{\Lambda_A \text{DFT}\{h_{2,D}\} + \Lambda_C \text{DFT}\{1,D\}\}$, and $w_2 \approx \text{IDFT}\{\Lambda_A \text{DFT}\{h_{1,D}\} + \Lambda_C^H \text{DFT}\{h_{2,D}\}\}$, wherein IDFT represents inverse discrete Fourier transform, and DFT represents discrete Fourier transform, $\Lambda_A = (D_{11}D_S^{-1})$ and $\Lambda_C = (-D_{12}D_S^{-1})$ are diagonal matrices, wherein $D_S = D_{11}D_{11} - D_{12}D_{12}^H$, $D_{11} = \text{diag}\{\underline{F} \cdot (S_{11})_1\}$, and $D_{12} = \text{diag}\{\underline{F} \cdot (S_{12})_1\}$, diag$\{x\}$ represents a diagonal matrix, and diagonal elements thereof are composed of elements of a vector x, moreover, $(\cdot)_1$ represents a vector composed of elements of a first column of the matrix, F represents a DFT matrix, $S_{11}$ and $S_{12}$ are circulant matrices approximated by $R_{11}$ and $R_{12}$, respectively, and $R_{11} = H_1H_1^H + H_2H_2^H + \sigma_v^2 I_F$, $R_{12} = H_2H_1^H$, wherein $\sigma_v^2$ represents a variance of a Gaussian noise within the transmission channel, $I_F$ represents a identity matrix with a dimension of F×F.

18. The equalization method as claimed in claim 13, wherein the equalization method further comprises:

searching a delay time difference between the first cluster and the second cluster, wherein the delay time difference is represented by K; and delaying the received signal r[m] for K unit time to obtain a cluster delayed signal r[m−K].

19. The equalization method as claimed in claim 18, wherein the number of the second weights is F, and the second weights are respectively represented as , $w_{2,0}$, $w_{2,1}$, $w_{2,2}$, ..., $w_{2,F-1}$, wherein the step of equalizing the received signal according to the second weights to obtain the second equalized signal comprises:

sequentially delaying the cluster delayed signals $r[m-K]$ for the unit time, and respectively outputting a plurality of second delayed signals, wherein the second delayed signals are represented by $r[m-K-1]$, $r[m-K-2]$, ..., $r[m-K-F+1]$;

respectively multiplying the cluster delayed signals $r[m-K]$ and the second delayed signals $r[m-K-1]$, $r[m-K-2]$, ..., $r[m-K-F+1]$ with conjugations of the corresponding second weights $w_{2,0}^*$, $w_{2,1}^*$, $w_{2,2}^*$, ..., $w_{2,F-1}^*$ to obtain a plurality of second multiplied signals $w_{2,0}^* \cdot r[m-K]$, $w_{2,1}^* \cdot r[m-K-1]$, $w_{2,2}^* \cdot r[m-K-2]$, ..., $w_{2,F-1}^* \cdot r[m-K-+1]$; and adding the second multiplied signals $w_{2,0}^* \cdot r[m-K]$, $w_{2,1}^* \cdot r[m-K-1]$, $w_{2,2}^* \cdot r[m-K-2]$, ..., $w_{2,F-1}^* \cdot r[m-K+1]$ to obtain the second equalized signal.

20. The equalization method as claimed in claim 18 further comprising a step of:

searching the delay paths within the transmission channel, and judging whether or not the number of the clusters within the transmission channel is greater than 1 according to the delay time corresponding to the delay paths after the received signal is received.

21. The equalization method as claimed in claim 20, wherein when the number of the clusters within the transmission channel is judged to be equal to 1, the method comprises:

estimating gains of the delay paths corresponding to the first cluster within the transmission channel;

performing the MMSE algorithm on the gains of the delay paths corresponding to the first cluster to obtain a plurality of the first weights;

equalizing the received signal according to the first weights to obtain a first equalized signal; and taking the first equalized signal as the combined signal, and outputting the combined signal.

22. A receiver, for receiving a received signal from a transmitter via a transmission channel, wherein the transmission channel has a plurality of delay paths, and the delay paths are at least grouped into a first cluster and a second cluster, the receiver comprising:

a channel estimation unit, for estimating gains of the delay paths corresponding to the first cluster, and gains of the delay paths corresponding to the second cluster;

a weight calculation unit, for performing an MMSE algorithm on the gains of the delay paths corresponding to the first cluster and the second cluster, so as to obtain a plurality of first weights and a plurality of second weights;

a first equalizer, for equalizing the received signal according to the first weights to obtain a first equalized signal; and a second equalizer, for equalizing the received signal according to the second weights to obtain a second equalized signal;

a combination unit, for combining the first equalized signal and the second equalized signal to output a combined signal; and a demodulation unit, for demodulating the combined signal and outputting a digital signal, wherein the received signal corresponding to a time index m is represented by $r[m]$, and the number of the first weights is F respectively represented as $w_{1,0}$, $w_{1,1}$, $w_{1,2}$, ..., $w_{1,F-1}$, and the first equalizer comprises:

a plurality of first delay units, for sequentially delaying the received signal $r[m]$ for the unit time, and respectively outputting a plurality of first delayed signals $r[m-1]$, $r[m-2]$, ..., $r[m-F+1]$;

a plurality of first multiplication units, for respectively multiplying the received signal $r[m]$ and the first delayed signals $r[m-1]$, $r[m-2]$, ..., $r[m-F+1]$ with conjugations of the first weights $w_{1,0}^*$, $w_{1,1}^*$, $w_{1,2}^*$, ..., $w_{1,F-1}^*$ to obtain a plurality of first multiplied signals $w_{1,0}^* \cdot r[m]$, $w_{1,1}^* \cdot r[m-1]$, $w_{1,2}^* \cdot r[m-]$, ..., $w_{1,F-1}^* \cdot [m-F+1]$; and a first adder, for adding the first multiplied signals $w_{1,0}^* \cdot r[m]$, $w_{1,1}^* \cdot r[m-1]$, $w_{1,2}^* \cdot r[m-2]$, ..., $w_{1,F-1}^* \cdot r[m-F+1]$ to obtain the first equalized signal.

23. The receiver as claimed in claim 22, wherein the receiver further comprises:

a cluster delay unit, for delaying the received signal $r[m]$ for K unit time to obtain a first cluster delayed signal $r[m-K]$.

24. The receiver as claimed in claim 23, wherein the number of the second weights is F, and the second weights are respectively represented as $w_{2,0}$, $w_{2,1}$, $w_{2,2}$, ..., $w_{2,F-1}$, and the second equalizer comprises:

a plurality of second delay units, for sequentially delaying the cluster delayed signals $r[m-K]$ for the unit time, and respectively outputting a plurality of second delayed signals, wherein the second delayed signals are represented by $r[m-K-1]$, $r[m-K-2]$, ..., $r[m-K-F+1]$;

a plurality of second multiplication units, for respectively multiplying the cluster delayed signals $r[m-K]$ the second delayed signals $r[m-K-1]$, $r[m-K-2]$, ..., $r[m-K-F+1]$ with conjugations of the corresponding second weights $w_{2,0}^*$, $w_{2,1}^*$, $w_{2,2}^*$, ..., $w_{2,F-1}^*$ to obtain a plurality of second multiplied signals $w_{2,0}^* \cdot r[m-K]$, $w_{2,1}^* \cdot r[m-K-1]$, $w_{2,2}^* \cdot [m-K-2]$, ..., $w_{2,F-1}^* \cdot r[m-K-F+1]$; and a second adder, for adding the second multiplied signals $w_{2,0}^* \cdot r[m-K]$, $w_{2,1}^* \cdot r[m-K-1]$, $w_{2,2}^* \cdot r[m-K-2]$, ..., $w_{2,F-1}^* \cdot r[m-K-F+1]$ to obtain the second equalized signal.

\* \* \* \* \*